(12) United States Patent
Takahashi

(10) Patent No.: US 12,375,413 B2
(45) Date of Patent: Jul. 29, 2025

(54) TRANSMISSION DEVICE, RECEPTION DEVICE, AND COMMUNICATION SYSTEM

(71) Applicant: Sony Semiconductor Solutions Corporation, Kanagawa (JP)

(72) Inventor: Hiroo Takahashi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 384 days.

(21) Appl. No.: 17/911,939

(22) PCT Filed: Apr. 9, 2021

(86) PCT No.: PCT/JP2021/014985
§ 371 (c)(1),
(2) Date: Sep. 15, 2022

(87) PCT Pub. No.: WO2021/215269
PCT Pub. Date: Oct. 28, 2021

(65) Prior Publication Data
US 2023/0143642 A1    May 11, 2023

(30) Foreign Application Priority Data
Apr. 24, 2020    (JP) .................................. 2020-077623

(51) Int. Cl.
*H04L 47/2475*    (2022.01)
*H04L 69/22*    (2022.01)

(52) U.S. Cl.
CPC .......... *H04L 47/2475* (2013.01); *H04L 69/22* (2013.01)

(58) Field of Classification Search
CPC ........................... H04L 47/2475; H04L 69/22
(Continued)

(56) References Cited

U.S. PATENT DOCUMENTS

2011/0093609 A1    4/2011    Blom
2018/0026748 A1*   1/2018    Jo ........................... H04L 67/12
                                                        714/776
(Continued)

FOREIGN PATENT DOCUMENTS

JP    2017211864 A    11/2017
WO    2020050555 A1    3/2020

OTHER PUBLICATIONS

International Search Report (PCT/ISA/210), International Application No. PCT/JP2021/014985, dated Jun. 29, 2021.
(Continued)

*Primary Examiner* — Wing F Chan
*Assistant Examiner* — Leon Y Tseng
(74) *Attorney, Agent, or Firm* — Michael Best & Friedrich LLP

(57) ABSTRACT

Transmission adaptable to a rule of packet modification prohibition on a transmission path is disclosed. In one example, transmission includes adding a packet header for extension to packet data obtained by packing data to be transmitted, and generating an application specific payload that is protected from modification on a transmission path. Supply of the application specific payload is switched to a selected one of a plurality of packet generation circuits, wherein the plurality of packet generation circuits are arranged in parallel for each of a plurality of types of physical layers, and each of the packet generation circuits is configured to add a packet header for a physical layer different from the packet header for extension for the application specific payload. A packet for the physical layer is generated by the selected one of the plurality of packet generation circuits.

12 Claims, 27 Drawing Sheets

(58) Field of Classification Search
USPC .......................................................... 709/239
See application file for complete search history.

(56) References Cited

U.S. PATENT DOCUMENTS

2018/0285301 A1*  10/2018  Thanigasalam ..... G06F 13/4027
2019/0260504 A1    8/2019  Joji
2020/0082370 A1    3/2020  Yang

OTHER PUBLICATIONS

Yi, Yang et al,Project : I Eeep 802.15 Work ing Group for Wireless Personal Area Networks(WPANs),IEEE 802.15-18/0458r0,IEEE, Sep. 12, 2018. <URL:https://mentor.ieee.org/802.15/dcn/18/15-18-0458-00-004z-inclusion-of-uwb-secureservice-information-element. ppt>.
Anonymous: "Ethernet frame—Wikipedia", Apr. 23, 2020 (Apr. 23, 2020), XP093252245.

* cited by examiner

TRANSMISSION DEVICE, RECEPTION DEVICE, AND COMMUNICATION SYSTEM

TECHNICAL FIELD

The present disclosure relates to a transmission device, a reception device, and a communication system, and particularly relates to a transmission device, a reception device, and a communication system made compatible with more various uses and adaptable to a rule of packet modification prohibition on a transmission path.

BACKGROUND ART

Currently, in camera serial interface (CSI)-2 ver4.0 in which standardization is in progress, two types of a packet structure using C-PHY for a physical layer and a packet structure using D-PHY for a physical layer are defined.

Furthermore, in recent years, the CSI-2 standard is not used only for mobile devices but has been widely used for various uses such as in-vehicle and Internet of things (IoT). As a result, it is assumed that existing packet structures cannot support these applications. Therefore, the mobile industry processor interface (MIPI) alliance is examining extension of a packet structure such as an existing packet header or packet footer in order to support various uses.

Furthermore, Patent Document 1 proposes a system that can reduce the number of data buses when connecting a processing device and a plurality of image sensors using the CSI-2 standard.

CITATION LIST

Patent Document

Patent Document 1: Japanese Patent Application Laid-Open No. 2017-211864

SUMMARY OF THE INVENTION

Problems to be Solved by the Invention

As described above, it is examined to extend a packet structure of a packet in the CSI-2 standard, and at that time, it is required to support various uses by being able to transmit more information while maintaining compatibility of the existing CSI-2 standard. At this point, it is necessary not to violate a rule prohibiting modification of the packet on a transmission path.

The present disclosure has been made in view of such a situation, and is made compatible with more various uses and adaptable to a rule of packet modification prohibition on a transmission path.

Solutions to Problems

A transmission device according to the first aspect of the present disclosure includes: an Application Specific payload generation unit configured to add a packet header for extension different from a packet header for a physical layer to packet data obtained by packing data to be transmitted, to generate an Application Specific payload limited as a protection range to be protected by prohibiting modification on a transmission path; and a packet generation unit configured to add at least a packet header for a predetermined physical layer to the Application Specific payload, to generate a packet for the physical layer.

In the first aspect of the present disclosure, a packet header for extension different from a packet header for a physical layer is added to packet data obtained by packing data to be transmitted and an Application Specific payload limited as a protection range to be protected by prohibiting modification on a transmission path is generated, and at least a packet header for a predetermined physical layer is added to the Application Specific payload and a packet for the physical layer is generated.

A reception device according to the second aspect of the present disclosure includes: a packet reception unit configured to receive a packet for a physical layer obtained by adding at least a packet header for the predetermined physical layer to an Application Specific payload that has a packet header for extension different from a packet header for a physical layer added to packet data obtained by packing data to be transmitted and is limited as a protection range to be protected by prohibiting modification on a transmission path; and an Application Specific payload acquisition unit configured to acquire the Application Specific payload from the packet.

In the second aspect of the present disclosure, a packet for a physical layer obtained by adding at least a packet header for a predetermined physical layer to an Application Specific payload that has a packet header for extension different from a packet header for a physical layer added to packet data obtained by packing data to be transmitted and is limited as a protection range to be protected by prohibiting modification on a transmission path is added, and the Application Specific payload is acquired from the packet.

A communication system according to the third aspect of the present disclosure includes: a transmission device in which a packet header for extension different from a packet header for a physical layer is added to packet data obtained by packing data to be transmitted and an Application Specific payload limited as a protection range to be protected by prohibiting modification on a transmission path is generated, and including a packet generation unit configured to add at least a packet header for a predetermined physical layer to the Application Specific payload, to generate a packet for the physical layer; and a reception device including a packet reception unit configured to receive the packet for the physical layer transmitted from the packet generation unit, and an Application Specific payload acquisition unit configured to acquire the Application Specific payload from the packet.

In the third aspect of the present disclosure, a packet header for extension different from a packet header for a physical layer is added to packet data obtained by packing data to be transmitted and an Application Specific payload limited as a protection range to be protected by prohibiting modification on a transmission path is generated, and at least a packet header for a predetermined physical layer is added to the Application Specific payload and a packet for the physical layer is generated. Then, the transmitted packet for the physical layer is received, and the Application Specific payload is acquired from the packet.

MODE FOR CARRYING OUT THE INVENTION

Hereinafter, specific embodiments to which the present technology is applied will be described in detail with reference to the drawings.

Configuration Example of Communication System

Figure 1:
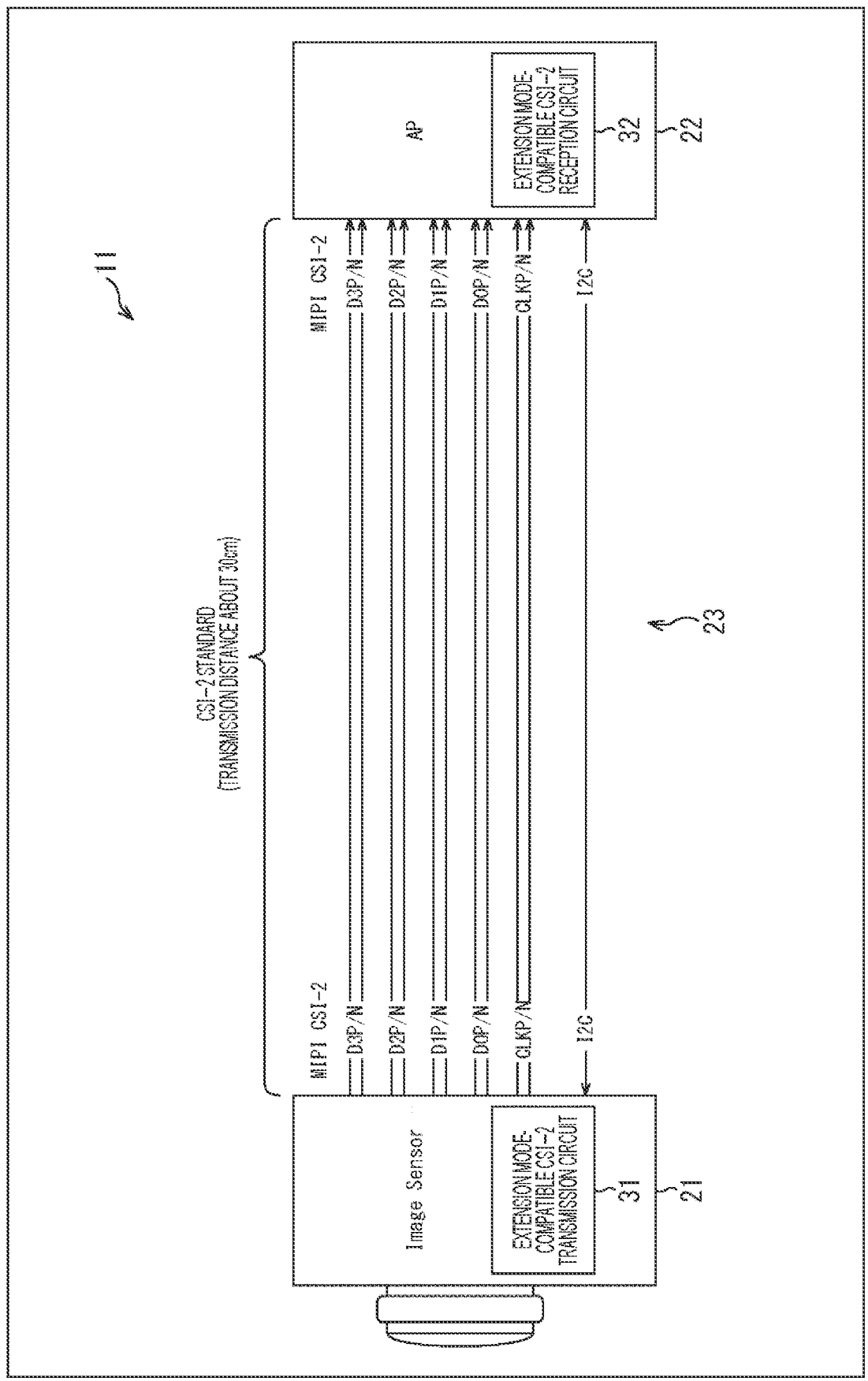
FIG. 1 is a block diagram illustrating a configuration example of a first embodiment of a communication system to which the present technology is applied.

FIG. 1 is a block diagram illustrating a configuration example of a first embodiment of a communication system to which the present technology is applied.

As illustrated in FIG. 1, a communication system 11 is configured by connecting an image sensor 21 and an application processor 22 via a bus 23. For example, the communication system 11 is used for CSI-2 connection inside an existing mobile device such as a so-called smartphone.

The image sensor 21 is configured by incorporating an extension mode-compatible CSI-2 transmission circuit 31 together with, for example, a lens, an imaging element (none of which are illustrated), and the like. For example, the image sensor 21 transmits image data of an image acquired by imaging by the imaging element to the application processor 22 by the extension mode-compatible CSI-2 transmission circuit 31.

The application processor 22 is configured by incorporating an extension mode-compatible CSI-2 reception circuit 32 together with a large scale integration (LSI) that performs processing according to various applications executed by a mobile device including the communication system 11. For example, the application processor 22 can receive the image data transmitted from the image sensor 21 by the extension mode-compatible CSI-2 reception circuit 32, and perform processing according to an application for the image data by the LSI.

The bus 23 is a communication path for transmitting a signal in conformity to the standard of CSI-2, and for example, a transmission distance capable of transmitting a signal is about 30 cm. Furthermore, as illustrated, the bus 23 connects the image sensor 21 and the application processor 22 by a plurality of signal lines (I2C, CLKP/N, DOP/N, D1P/N, D2P/N, and D3P/N).

The extension mode-compatible CSI-2 transmission circuit 31 and the extension mode-compatible CSI-2 reception circuit 32 are compatible with communication in an extension mode obtained by extending the standard of CSI-2, and can transmit and receive signals to and from each other. Note that the detailed configurations of the extension mode-compatible CSI-2 transmission circuit 31 and the extension mode-compatible CSI-2 reception circuit 32 will be described below with reference to FIGS. 9 and 10.

Figure 2:
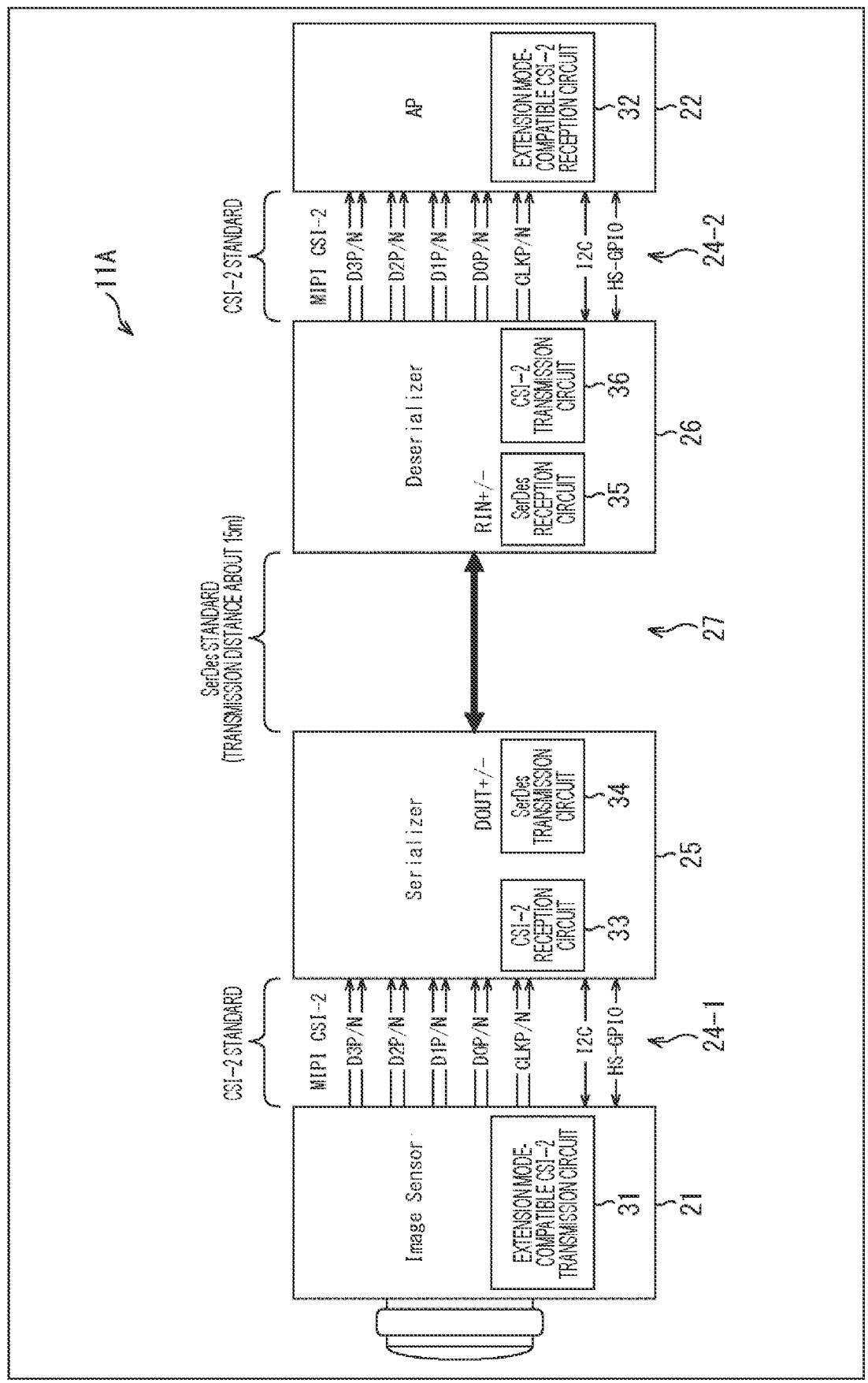
FIG. 2 is a block diagram illustrating a configuration example of a second embodiment of a communication system to which the present technology is applied.

FIG. 2 is a block diagram illustrating a configuration example of a second embodiment of a communication system to which the present technology is applied.

As illustrated in FIG. 2, a communication system 11A is configured by connecting an image sensor 21 and a serializer 25 via a bus 24-1, an application processor 22 and a deserializer 26 via a bus 24-2, and the serializer 25 and the deserializer 26 via a bus 27. For example, the communication system 11A is used for connection in an existing in-vehicle camera.

Here, the image sensor 21 and the application processor 22 are configured similarly to the image sensor 21 and the application processor 22 in FIG. 1, and detailed description thereof is omitted.

The buses 24-1 and 24-2 are communication paths for transmitting signals in conformity to the standard of CSI-2, similarly to the bus 23 in FIG. 1, and include a plurality of signal lines (HS-GPIO, I2C, CLKP/N, D0P/N, D1P/N, D2P/N, and D3P/N) as illustrated in the drawing.

The serializer 25 includes a CSI-2 reception circuit 33 and a serializer deserializer (SerDes) transmission circuit 34. For example, the serializer 25 acquires a bit-parallel signal transmitted from the image sensor 21 by the CSI-2 reception circuit 33 communicating with the extension mode-compatible CSI-2 transmission circuit 31 conforming to the standard of normal CSI-2. Then, the serializer 25 converts the acquired signal into a bit-series signal, and the SerDes transmission circuit 34 performs communication with a SerDes reception circuit 35 in one lane, thereby transmitting the signal to the deserializer 26.

The deserializer 26 includes the SerDes reception circuit 35 and a CSI-2 transmission circuit 36. For example, the deserializer 26 acquires the bit-series signal transmitted when the SerDes reception circuit 35 communicates with the SerDes transmission circuit 34 in one lane. Then, the deserializer 26 converts the acquired signal into a bit-parallel signal, and the CSI-2 transmission circuit 36 performs communication conforming to the standard of normal CSI-2 with the extension mode-compatible CSI-2 reception circuit 32, thereby transmitting the signal to the application processor 22.

The bus 27 is a communication path for transmitting a signal in conformity to the standard of A-PHY or a flat panel display (FPD)-LINK III or the like, and for example, the transmission distance capable of transmitting a signal is about 15 m.

The communication systems 11 and 11A configured as described above can transmit and receive data using packets having an extended packet structure as described below by the extension mode-compatible CSI-2 transmission circuit 31 and the extension mode-compatible CSI-2 reception circuit 32. Thereby, it is possible to support more various uses, for example, RAW 24, SmartROI (Region of Interest), GLD (Graceful Link Degradation), and the like as described below.

First Structure Example of Packet Structure

A first structure example of a packet structure of a packet used for communication between the extension mode-compatible CSI-2 transmission circuit 31 and the extension mode-compatible CSI-2 reception circuit 32 will be described with reference to FIGS. 3 to 8.

Figure 3:
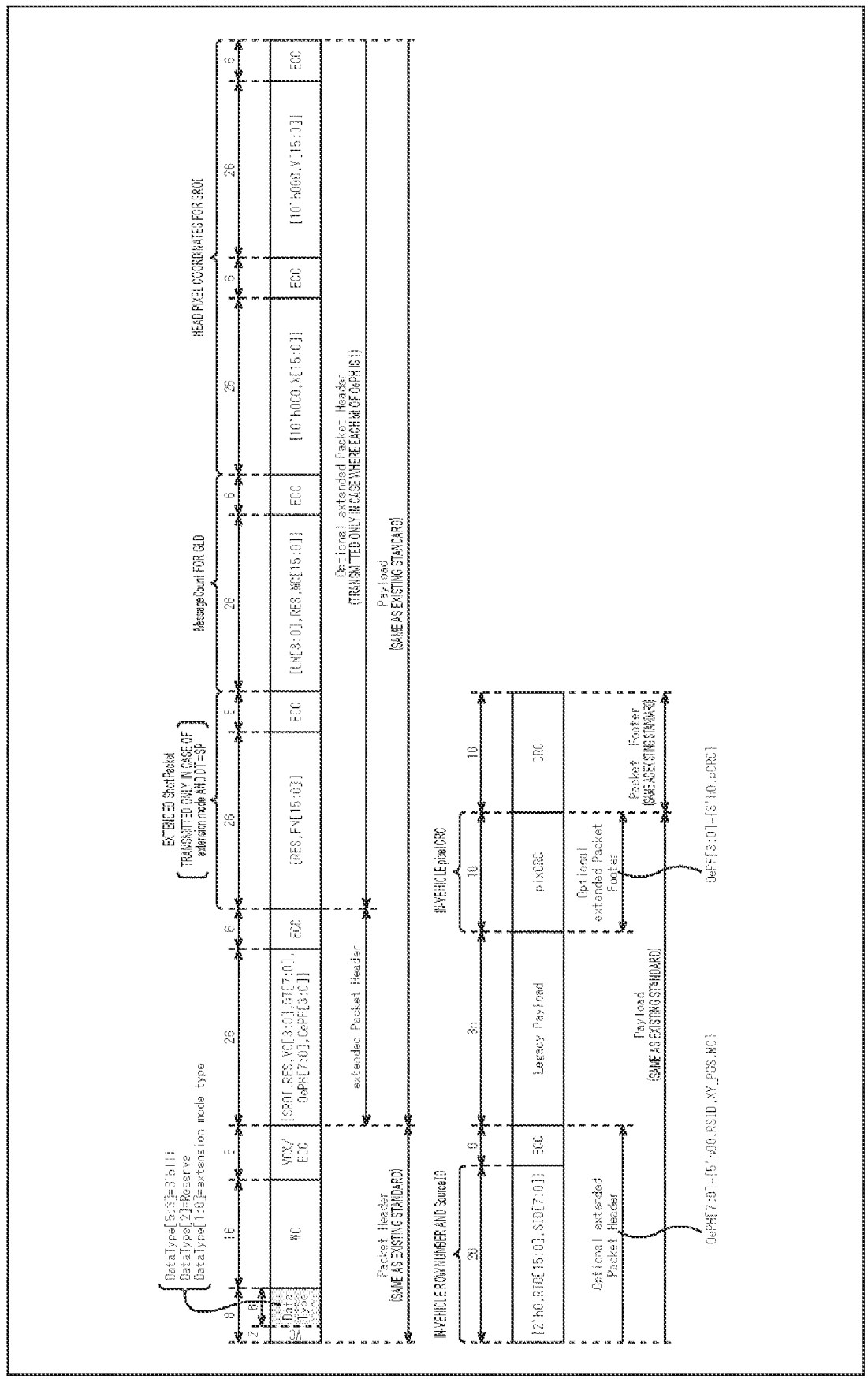
FIG. 3 is a diagram illustrating a first structure example of an overall packet structure of an extended packet for D-PHY.

FIG. 3 illustrates an overall packet structure of a packet (hereinafter referred to as an extended packet for D-PHY) used in the extension mode of CSI-2 in a case where the physical layer is D-PHY.

As illustrated in FIG. 3, the extended packet for D-PHY has a packet structure in which a packet header and a packet footer are the same as those of the existing CSI-2 standard. For example, VirtualChannel (VC) indicating the number of lines of virtual channels, a data type (DataType) indicating a type of data, word count (WC) indicating a data length of a payload, and VCX/ECC are stored in the packet header. Furthermore, a cyclic redundancy check (CRC) is stored in the packet footer.

Here, in the existing CSI-2 standard, as the data type transmitted in the packet header, 0×38 to 0×3F are defined as reserve. Therefore, in the extended packet for D-PHY, setting information for identifying the extension mode on the reception side is newly defined using the data type that is already reserve.

For example, as the data type,
in the case of DataType[5:3]=3'b111, the extension mode,
DataType[2]=Reserve (RES: reservation for future expansion), and
DataType[1:0]=extension mode type (four extension modes are prepared)
are defined.

That is, for example, DataType[5:3] is defined as an extension mode setting information and DataType[1:0] is defined as extension type setting information among 0×38 to 0×3F of the data types defined as reserve in the existing CSI-2 standard. The extension mode setting information indicates whether or not the data type is the extension mode, and for example, in a case where DataType[5:3] is 3'b111, the information indicates the extension mode. Furthermore, when four types of extension mode 0, extension mode 1, extension mode 2, and extension mode 3 are prepared as the types of extension modes, the extension type setting information indicates one of the four types of extension modes. For example, in a case where DataType[1:0] is 2'b00, the information indicates that the type of the extension mode is the extension mode 0.

Then, in the extension mode 0 (DataType[1:0]=2'b00), for example, a packet structure in which the payload is separated into four is defined. That is, as illustrated in FIG. 3, the payload in the extension mode 0 is separated into an extended packet header (ePH), an optional extended packet header (OePH), a legacy payload, and an optional extended packet footer (OePF). Note that the extended packet header may be repeatedly transmitted.

The extended packet header is arranged in a head corresponding to the payload of the existing CSI-2 standard, and needs to be always transmitted in the extension mode. For example, as illustrated, the extended packet header includes setting information such as an identification flag of SROI, an extended virtual channel (VC), an extended DataType, a selection flag of OePH, and a selection flag of OePF. Here, VC that has been four bits in the existing CSI-2 standard is extended to eight bits by the extended VC, and DataType that has been four bits in the existing CSI-2 standard is extended to eight bits by the extended DataType.

For example, in the packet for D-PHY, four bits of VC of the existing packet header already exist, and the total number of bits can be set to eight by defining the extended VC of the extended packet header as four bits. Specifically, OePH[7:0]={5'h00, RSID, XY_POS, MC} and OePF[3:0]={3'h0, pCRC} can be defined, and ON/OFF of packet transmission required for each use can be controlled.

The optional extended packet header and the optional extended packet footer are selectively transmitted according to the use.

The legacy payload corresponds to the same payload as the existing CSI-2 standard.

In this way, by setting the extended packet header, the optional extended packet header, and the optional extended packet footer as necessary, data corresponding to various uses can be transmitted. Furthermore, the data transmitted in the extended packet header, the optional extended packet header, and the optional extended packet footer is twenty six bits+six bits of error correction code (ECC). Thereby, it is possible to suppress an increase in circuit scale by diverting the circuit of the existing packet header and to improve error resistance.

Figure 4:
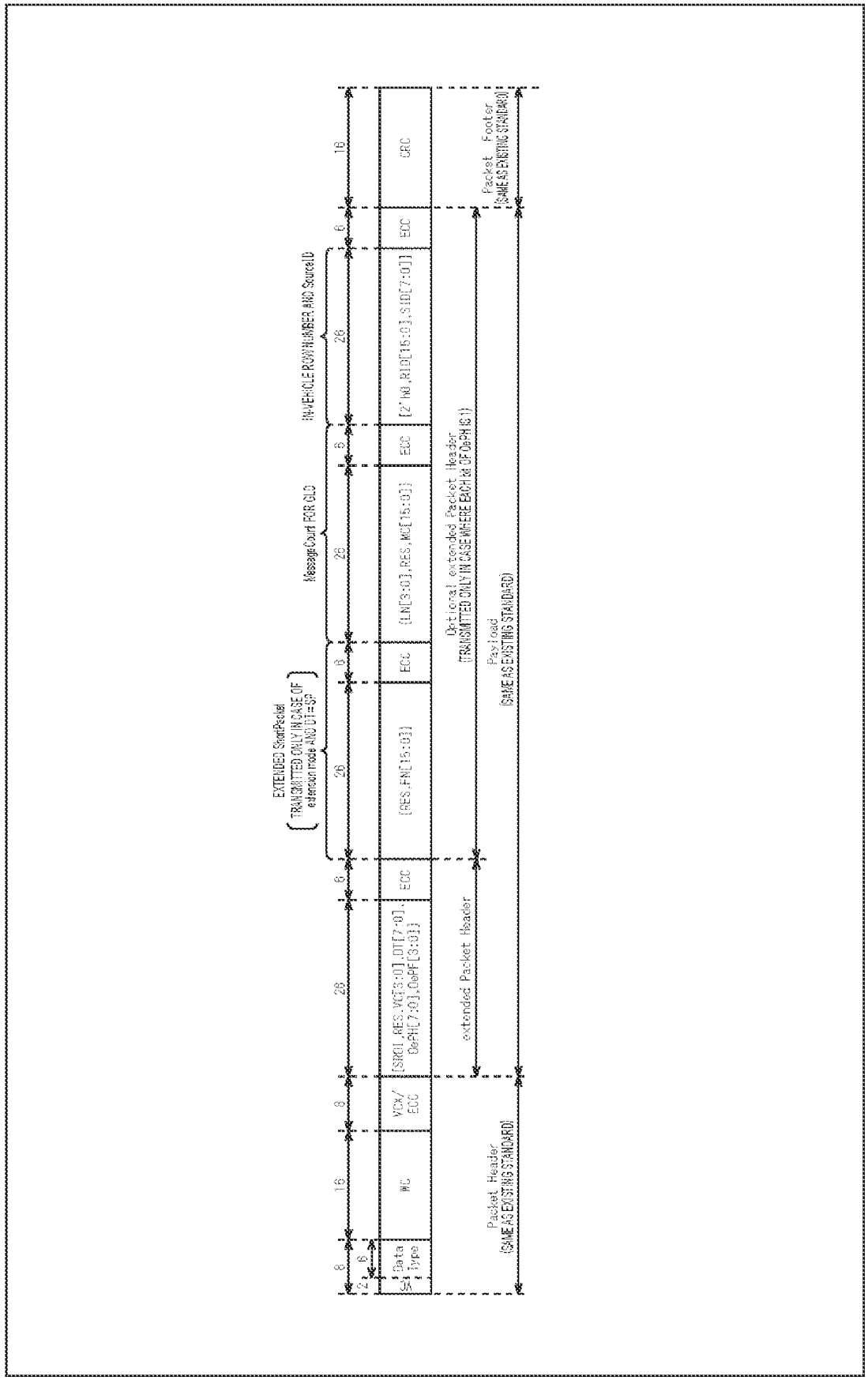
FIG. 4 is a diagram illustrating a first structure example of a packet structure of an extended short packet for D-PHY.
Figure 5:
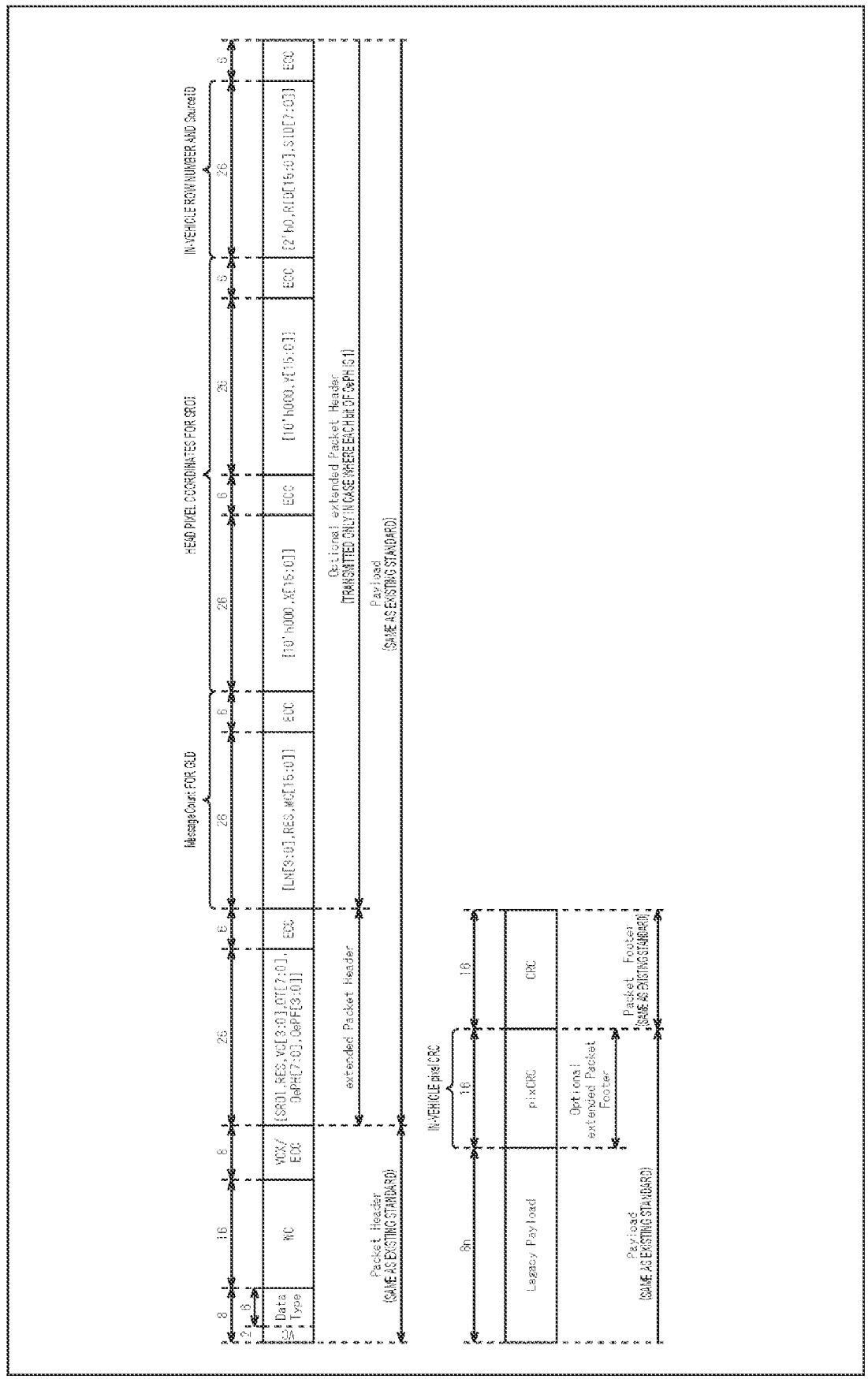
FIG. 5 is a diagram illustrating a first structure example of a packet structure of an extended long packet for D-PHY.

As a specific application example of such an extended packet for D-PHY, FIG. 4 illustrates a packet structure of a short packet (hereinafter referred to as an extended short packet for D-PHY) used in the extension mode of CSI-2 in the case where the physical layer is D-PHY. Similarly, FIG. 5 illustrates a packet structure of a long packet (hereinafter referred to as an extended long packet for D-PHY) used in the extension mode of CSI-2 in the case where the physical layer is D-PHY.

In the extended short packet for D-PHY as illustrated in FIG. 4, the extension type setting information of the data type stored in the packet header indicates that the type of the extension mode is the extension mode 0 (DT[5:0]=0×1C (5'b111_0_0)). Furthermore, short packet setting information of the data type stored in the extended packet header indicates that the packet is a short packet (DT[7:0]=0×00 (Frame Start Code (Short Packet))).

As described above, in the extension mode and in the case where the data type stored in the extended packet header is DT[7:0]=0×00 to 0×0F, the extended short packet is set, and data including Short Packet Data Field of the extended short packet is always transmitted to the optional extended packet header. The Short Packet Data Field is the same as that defined in the existing CSI-2 standard.

Note that, at the time of transmission of the extended short packet, MessageCount for GLD (MC), and an in-vehicle row number and SourceID (RSID) of the optional extended packet header may be transmitted, but legacy payload and pCRC are unnecessary and thus transmission is prohibited. If the legacy payload and pCRC are erroneously transmitted, they are ignored on the reception side.

Then, the extended short packet having the packet structure as illustrated in FIG. 4 can extend the data type and a bit width of the virtual channel as compared with the extended short packet conforming to the existing CSI-2 standard, and can support various uses defined in the optional extended packet header. Furthermore, in a case where these functions are not required, the extended short packet conforming to the existing CSI-2 standard may be transmitted together with the extended long packet.

In the extended long packet for D-PHY as illustrated in FIG. 5, the extension type setting information of the data type stored in the packet header indicates that the type of the extension mode is the extension mode 0 (DT[5:0]=0×1C (5'b111_0_0)). Furthermore, the short packet setting information of the data type stored in the extended packet header indicates that the packet is other than a short packet (DT[7:0] is other than 0×00 to 0×0F (=extended LongPackt)). Therefore, in the extended long packet, the data including Short Packet Data Field is not transmitted.

Furthermore, according to the setting of the extended packet header, the optional extended packet header, the legacy payload, and the optional extended packet footer are stored in the payload in the existing CSI-2 standard and transmitted. In this way, since the data is stored in the existing payload and transmitted, the data is recognized by the existing SerDes transmission circuit 34 and SerDes reception circuit 35 (FIG. 2) in a similar manner to image data transmitted in the existing payload and are transmitted as it is to a subsequent stage.

Then, the application processor 22 in the last stage can determine that the data type is the extension mode according to the data type DT[5:0] of the packet header. Therefore, the application processor 22 can sequentially interpret the content of the payload from the extended packet header and extract data of a desired extension mode.

Figure 6:
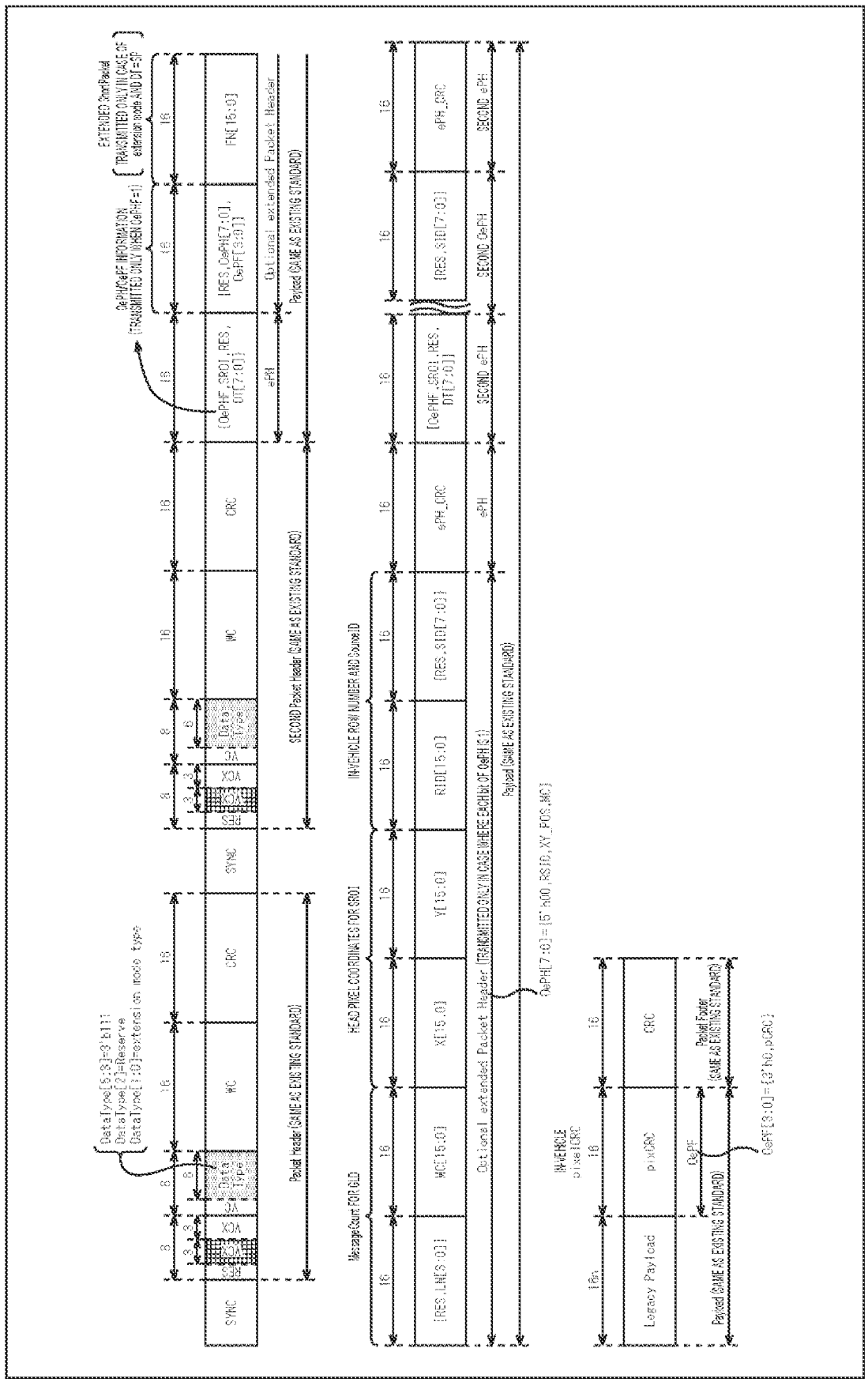
FIG. 6 is a diagram illustrating a first structure example of an overall packet structure of an extended packet for C-PHY.

FIG. 6 illustrates an overall packet structure of a packet (hereinafter referred to as an extended packet for C-PHY) used in the extension mode of CSI-2 in a case where the physical layer is C-PHY. Note that, in the extended packet for C-PHY illustrated in FIG. 6, description of configurations common to the extended packet for D-PHY in FIG. 3 is omitted, and different configurations will be described.

For example, in the extended packet for C-PHY, similarly to the extended packet for D-PHY in FIG. 3, the extension mode is identified by the data type, and all the data corresponding to each application executed by the application processor 22 are embedded in the payload and transmitted.

As illustrated in FIG. 6, the extended packet for C-PHY transmits the packet header twice, similarly to the packet for C-PHY conforming to the existing CSI-2 standard, and arranges the data in units of sixteen bits for convenience of conversion of sixteen bits into seven symbols by the C-PHY. Furthermore, the extended packet header is arranged in the head of the payload. Regarding the virtual channel, in the case of C-PHY, the head of the existing packet header is Reserved for this purpose. Therefore, the virtual channel is not stored in the extended packet header. Of course, the virtual channel may be stored in the extended packet header similarly to the extended packet for D-PHY.

Furthermore, since the optional extended packet header and the optional extended packet footer have a long bit depth, a flag OePHF is prepared, and in a case where the flag is 1, OePH/OePF information is transmitted to the next. Then, after the ePH information and the OePH information, CRC is transmitted as the extended packet header, and a packet header similarly configured is repeatedly transmitted twice. In this manner, by making the structure the same as the mechanism in which the existing packet header is transmitted twice, it is possible to achieve both circuit reusability and error resistance.

Figure 7:
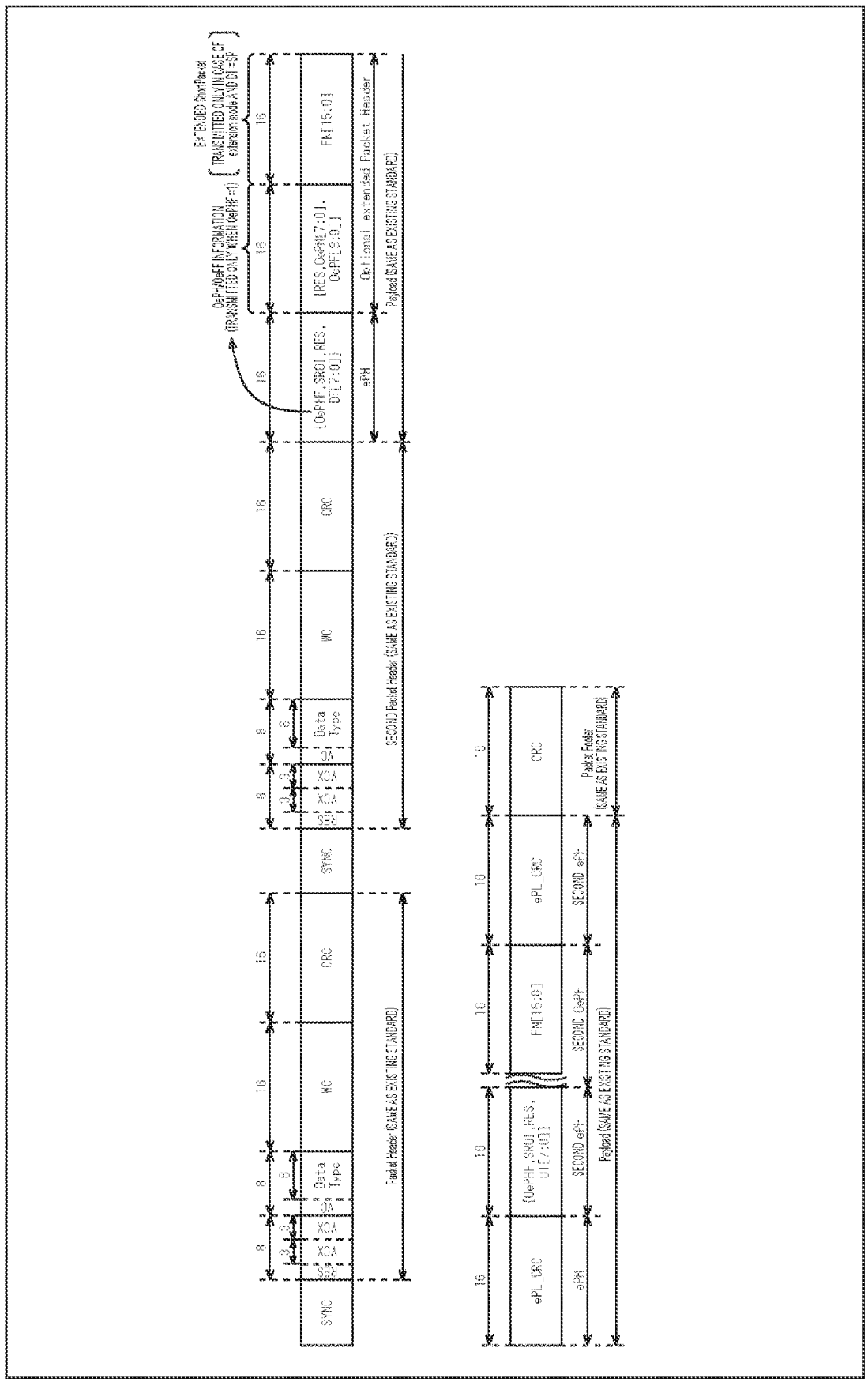
FIG. 7 is a diagram illustrating a first structure example of a packet structure of an extended short packet for C-PHY.

As a specific application example of such an extended packet for C-PHY, FIG. 7 illustrates a packet structure of a short packet (hereinafter referred to as an extended short packet for C-PHY) used in the extension mode of CSI-2 in the case where the physical layer is C-PHY. Similarly, FIG. 8 illustrates a packet structure of a long packet (hereinafter referred to as an extended long packet for C-PHY) used in the extension mode of CSI-2 in the case where the physical layer is C-PHY.

Figure 8:
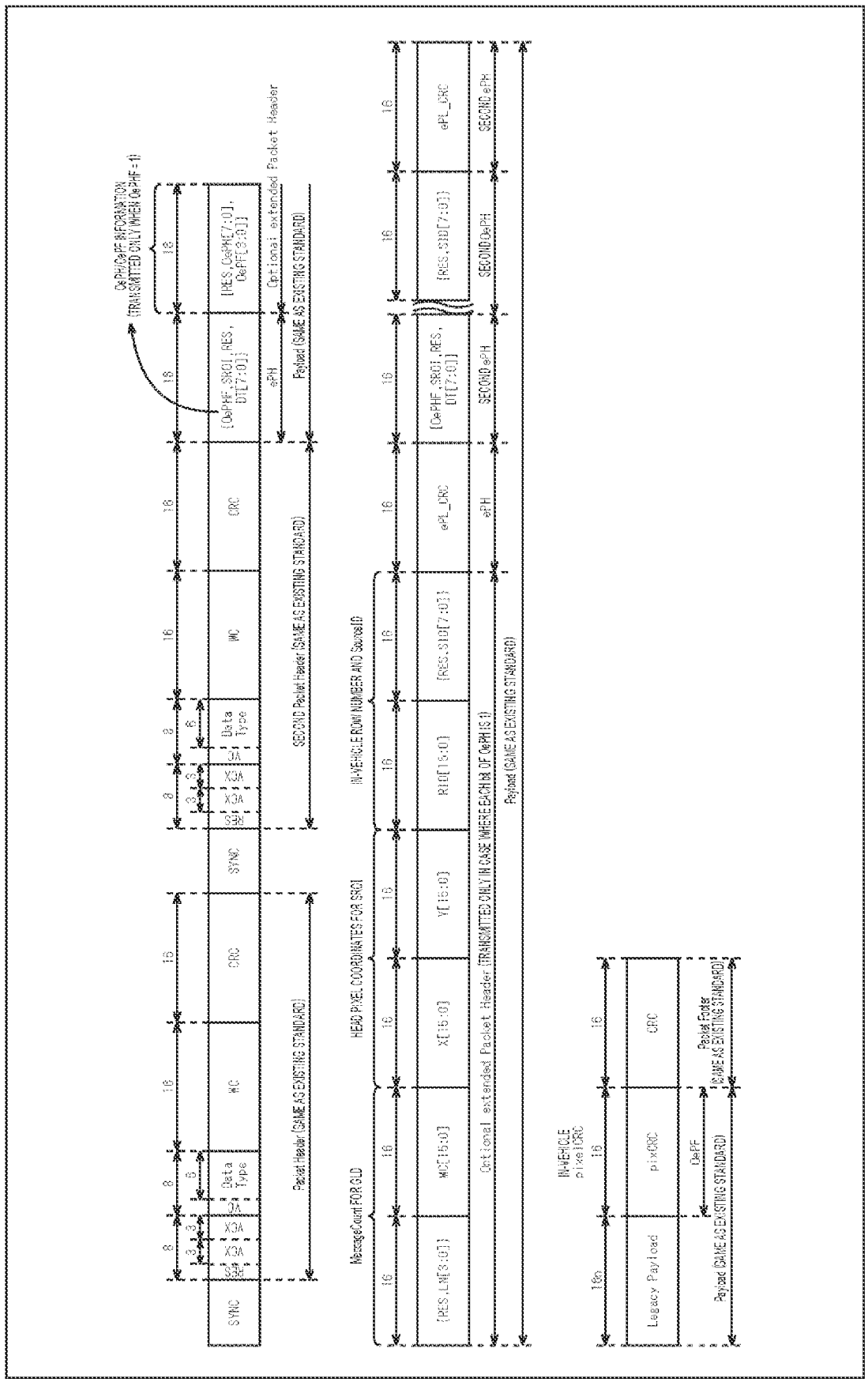
FIG. 8 is a diagram illustrating a first structure example of a packet structure of an extended long packet for C-PHY.

Note that the extended short packet for C-PHY illustrated in FIG. 7 does not have a large difference in packet structure from the extended short packet for D-PHY illustrated in FIG. 4, and the extended long packet for C-PHY illustrated in FIG. 8 does not have a large difference in packet structure from the extended long packet for D-PHY illustrated in FIG. 5.

Configuration Example of Image Sensor and Application Processor

Figure 9:
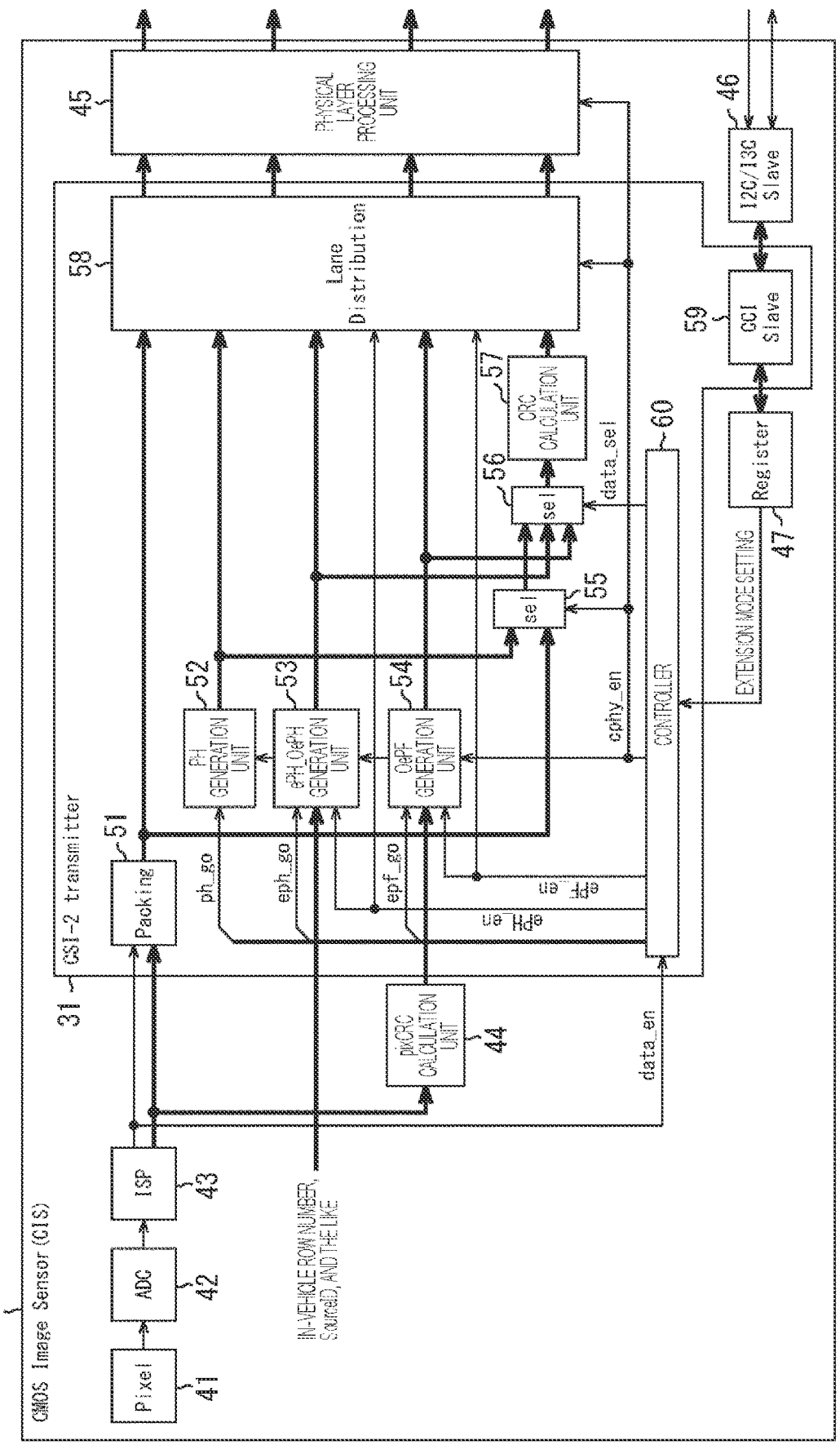
FIG. 9 is a block diagram illustrating a configuration example of an image sensor.

FIG. 9 is a block diagram illustrating a configuration example of the image sensor 21 including the extension mode-compatible CSI-2 transmission circuit 31.

As illustrated in FIG. 9, the image sensor 21 includes a pixel 41, an AD converter 42, an image processing unit 43, a pixel CRC calculation unit 44, a physical layer processing unit 45, an I2C/I3C slave 46, and a register 47 in addition to the extension mode-compatible CSI-2 transmission circuit 31. Furthermore, the extension mode-compatible CSI-2 transmission circuit 31 includes a packing unit 51, a packet header generation unit 52, an extended packet header generation unit 53, an extended packet footer generation unit 54, selection units 55 and 56, a CRC calculation unit 57, a lane distribution unit 58, a CCI slave 59, and a controller 60.

The pixel 41 outputs an analog pixel signal corresponding to an amount of received light, and an analog-to-digital converter (ADC) 42 digitally converts the pixel signal output from the pixel 41 and supplies the pixel signal to the image processing unit 43. The image processing unit (image signal processor: ISP) 43 supplies image data obtained by applying various types of image processing to an image based on the pixel signal to the pixel CRC calculation unit 44 and the packing unit 51. Furthermore, the image processing unit 43 supplies a data enable signal data_en indicating whether or not the image data is valid to the packing unit 51 and the controller 60.

The pixel CRC calculation unit 44 calculates and obtains CRC for each pixel in the image data supplied from the image processing unit 43, and supplies the CRC to the extended packet footer generation unit 54.

The physical layer processing unit 45 can execute physical layer processing of both C-PHY and D-PHY. For example, the physical layer processing unit 45 executes the physical layer processing of C-PHY in a case where a C-layer enable signal cphy_en supplied from the controller 60 is valid, and executes the physical layer processing of D-PHY in a case where the C-layer enable signal cphy_en is invalid. Then, the physical layer processing unit 45 transmits the packet divided into four lanes by the lane distribution unit 58 to the application processor 22.

The I2C/I3C slave 46 performs communication under the initiative of an I2C/I3C master 72 (FIG. 10) of the application processor 22 on the basis of inter-integrated circuit (I2C) or improved inter integrated circuit (I3C) standard.

Various settings transmitted from the application processor 22 are written to the register 47 via the I2C/I3C slave 46 and the CCI slave 59. Here, examples of the settings written to the register 47 include a communication setting conforming to the CSI-2 standard, an extension mode setting indicating the presence or absence of use of the extension, and a fixed communication setting necessary for communication in the extension mode.

The packing unit 51 performs packing processing of storing the image data supplied from the image processing unit 43 in the payload of the packet, and supplies the payload to the selection unit 55 and the lane distribution unit 58.

When generation of the packet header is instructed according to a packet header generation instruction signal ph_go supplied from the controller 60, the packet header generation unit 52 generates the packet header and supplies the packet header to the selection unit 55 and the lane distribution unit 58.

That is, the packet header generation unit 52 generates the packet header that stores setting information indicating a condition set for the data transmitted in the packet, for example, the data type indicating the type of the data according to the existing CSI-2 standard. Furthermore, the packet header generation unit 52 stores the extension mode setting information indicating whether or not the mode is the extension mode for using an extended header in an unused area defined as unused in the existing CSI-2 standard in the data type that is the setting information indicating the type of data transmitted in the packet. Moreover, the packet header generation unit 52 stores the extension type setting information indicating one of the plurality of types of extension modes prepared as the extension modes is in the unused area.

The extended packet header generation unit 53 generates each of the extended packet header and the optional extended packet header according to the extended packet header generation instruction signal eph_go and an extended packet header enable signal ePH_en supplied from the controller 60, and supplies the extended packet header and the optional extended packet header to the selection unit 56 and the lane distribution unit 58. Furthermore, the in-vehicle row number, the source ID (identification), and the like are supplied to the extended packet header generation unit 53 according to the use of the image sensor 21, and are stored in the extended packet header or the optional extended packet header as necessary.

In other words, the extended packet header generation unit 53 generates the extended packet header that stores the setting information as illustrated in FIG. 3, for example, separately from the packet header generated by the packet header generation unit 52. Moreover, in the case of transmitting the optional extended packet header, the extended packet header generation unit 53 stores optional extended packet header setting information indicating transmission of the optional extended packet header in the extended packet header as the optional extended packet header setting information (OePH[7:0]) indicating whether or not to transmit the optional extended packet header, and generates the optional extended packet header following the extended packet header.

The extended packet footer generation unit 54 generates the optional extended packet footer according to an extended packet footer generation instruction signal epf_go and an extended packet header enable signal ePF_en supplied from the controller 60, and supplies the optional extended packet footer to the selection unit 56 and the lane distribution unit 58.

That is, in a case where the packet transmitted in the extension mode is the extended long packet that stores data to be transmitted as the payload in the existing CSI-2 standard, the extended packet footer generation unit 54 generates the optional extended packet footer arranged following the legacy payload in which data is stored.

Furthermore, the C-layer enable signal cphy_en is supplied from the controller 60 to the packet header generation unit 52, the extended packet header generation unit 53, and the extended packet footer generation unit 54. Then, in the case where the C-layer enable signal cphy_en indicates valid, the packet header generation unit 52 generates the packet header for C-PHY, the extended packet header generation unit 53 generates the extended packet header and the optional extended packet header for C-PHY, and the extended packet footer generation unit 54 generates the optional extended packet footer for C-PHY. On the other hand, in the case where the C-layer enable signal cphy_en indicates invalid, the packet header generation unit 52 generates the packet header for D-PHY, the extended packet header generation unit 53 generates the extended packet header and the optional extended packet header for D-PHY, and the extended packet footer generation unit 54 generates the optional extended packet footer for D-PHY.

In the case where the C-layer enable signal cphy_en is valid according to the C-layer enable signal cphy_en supplied from the controller 60, the selection unit 55 selects the packet header supplied from the packet header generation unit 52 and supplies the packet header to the selection unit 56. On the other hand, in the case where the C-layer enable signal cphy_en is invalid, the selection unit 55 selects the payload supplied from the packing unit 51 and supplies the payload to the selection unit 56.

The selection unit 56 selects, according to a data selection signal data_sel supplied from the controller 60, any one of the packet header or the payload selectively supplied via the selection unit 55, the extended packet header and the optional extended packet header supplied from the extended packet header generation unit 53, or the optional extended packet footer supplied from the extended packet footer generation unit 54, and supplies the selected one to the CRC calculation unit 57.

The CRC calculation unit 57 calculates and obtains CRC of the packet header, the payload, the extended packet header, the optional extended packet header, or the optional extended packet footer selectively supplied via the selection unit 56, and supplies the CRC to the lane distribution unit 58.

The lane distribution unit 58 distributes, under the control of the controller 60, the payload supplied from the packing unit 51, the packet header supplied from the packet header generation unit 52, the extended packet header and the optional extended packet header supplied from the extended packet header generation unit 53, the optional extended packet footer supplied from the extended packet footer generation unit 54, and the CRC supplied from the CRC calculation unit 57 to four lanes conforming to the CSI-2 standard, and supplies them to the physical layer processing unit 45.

The camera control interface (CCI) slave 59 performs communication under the initiative of a CCI master 88 (FIG. 10) of the application processor 22 on the basis of the CSI-2 standard.

The controller 60 reads the various settings stored in the register 47, and controls each block constituting the extension mode-compatible CSI-2 transmission circuit 31 according to the settings. For example, the controller 60 controls switching between transmission of the packet having the packet structure conforming to the existing CSI-2 standard and transmission of the packet having the packet structure in the extension mode according to content of data to be transmitted.

The image sensor 21 is configured in this manner, and can generate the extended packet having the packet structure as described with reference to FIGS. 3 to 8 and transmit the extended packet to the application processor 22.

Figure 10:
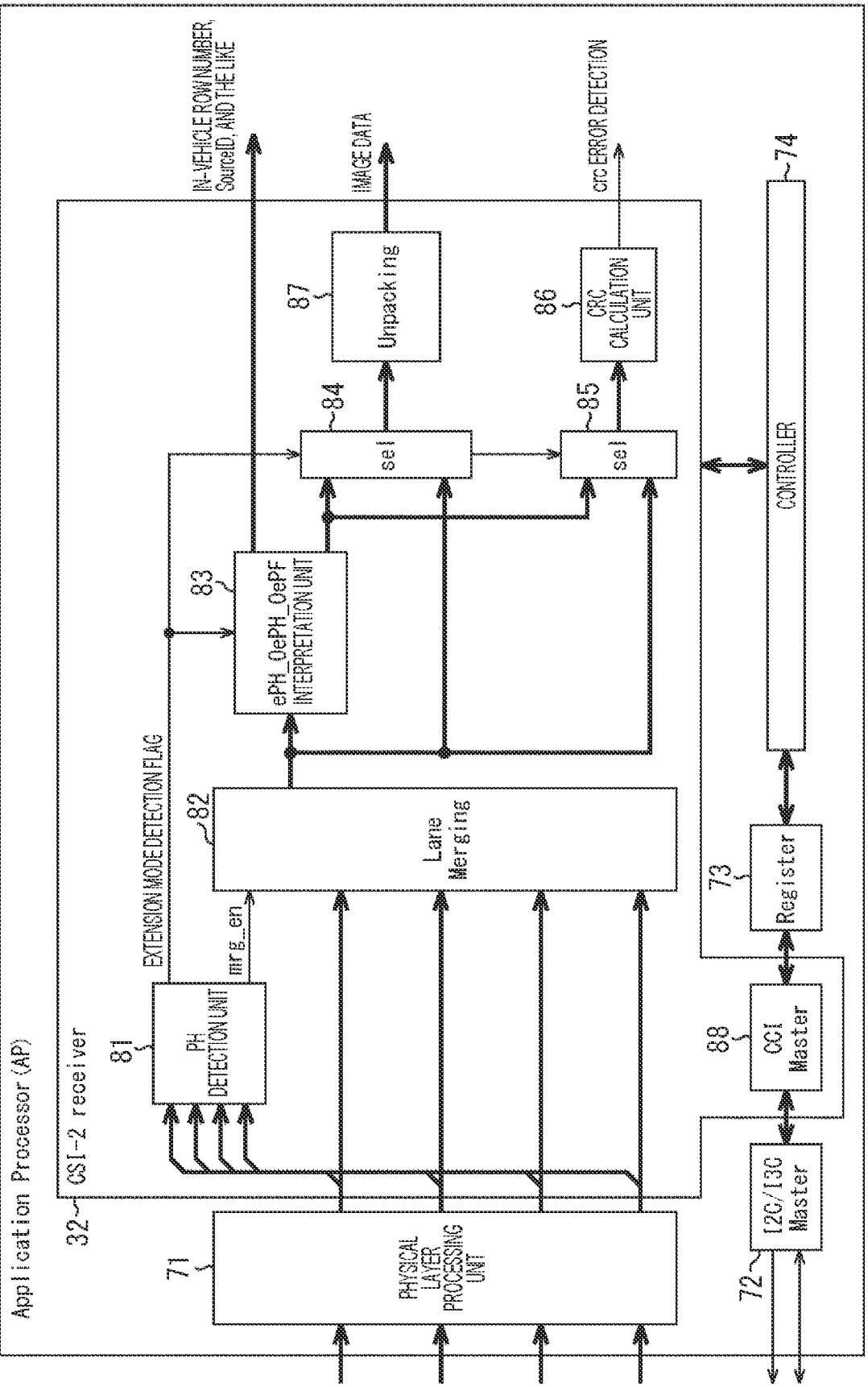
FIG. 10 is a block diagram illustrating a configuration example of an application processor.

FIG. 10 is a block diagram illustrating a configuration example of the application processor 22 including the extension mode-compatible CSI-2 reception circuit 32.

As illustrated in FIG. 10, the application processor 22 includes a physical layer processing unit 71, an I2C/I3C master 72, a register 73, and a controller 74 in addition to the extension mode-compatible CSI-2 reception circuit 32. Furthermore, the extension mode-compatible CSI-2 reception circuit 32 includes a packet header detection unit 81, a lane merging unit 82, an interpretation unit 83, selection units 84 and 85, a CRC calculation unit 86, an unpacking unit 87, and a CCI master 88.

The physical layer processing unit 71 can execute physical layer processing of both C-PHY and D-PHY. As described above, the physical layer processing unit 45 of the image sensor 21 performs the physical layer processing of either C-PHY or D-PHY, and the physical layer processing unit 71 executes the same physical layer processing as that executed in the physical layer processing unit 45.

The I2C/I3C master 72 leads communication with the I2C/I3C slave 46 (FIG. 9) of the image sensor 21 on the basis of the I2C or I3C standard.

Various settings to be written into the register 47 of the image sensor 21 are recorded in the register 73 by the controller 74.

The controller 74 controls each block constituting the application processor 22.

The packet header detection unit 81 detects the packet header from the packet supplied from the physical layer processing unit 71 and checks the data type stored in the packet header. Then, in a case where the extension mode setting information indicates the extension mode in the data type of the packet header (DataType[5:3]=3'b111), the packet header detection unit 81 supplies an extension mode detection flag indicating the extension mode to the interpretation unit 83, the selection unit 84, and the selection unit 85. Furthermore, the packet header detection unit 81 supplies a merging enable signal mrg_en indicating whether or not merging of the divided four lanes is enabled to the lane merging unit 82 on the basis of the packet header.

That is, the packet header detection unit 81 detects the packet header in which the setting information (the data type or the like) indicating the condition set for the data to be transmitted in the packet is stored according to the existing CSI-2 standard. At this point, the packet header detection unit 81 outputs the extension mode detection flag according to the extension mode setting information indicating whether or not the mode is the extension mode for using the extended header stored in the unused area defined as unused in the existing CSI-2 standard in the data type that is the setting information indicating the type of data transmitted in the packet, thereby switching reception of the packet having the packet structure conforming to the existing CSI-2 standard and reception of the packet having the packet structure in the extension mode. Furthermore, the packet header detection unit 81 recognizes one of the plurality of types of extension modes prepared as the extension modes according to extension mode type information stored in the unused area of the data type defined as unused in the existing CSI-2 standard.

In a case where the merging enable signal mrg_en supplied from the packet header detection unit 81 is valid, the lane merging unit 82 merges the packets divided into four lanes and supplied from the physical layer processing unit 71. Then, the lane merging unit 82 supplies the packet of one lane to the interpretation unit 83, the selection unit 84, and the selection unit 85.

In a case where the extension mode detection flag supplied from the packet header detection unit 81 indicates the extension mode, the interpretation unit 83 reads the extended packet header, the optional extended packet header, and the optional extended packet footer from the packet supplied from the lane merging unit 82 on the basis of the packet structure of the extension mode. Then, the interpretation unit 83 interprets the setting information stored in the extended packet header, the optional extended packet header, and the optional extended packet footer.

That is, the interpretation unit 83 receives, as the extended header, the extended packet header disposed in the head of the payload conforming to the existing CSI-2 standard, and interprets the setting information stored in the extended packet header. Furthermore, in a case where the optional extended packet header setting information stored in the extended packet header indicates transmission of the optional extended packet header that is selectively transmitted according to the use, the interpretation unit 83 receives the optional extended packet header following the extended packet header, and interprets the setting information stored in the optional extended packet header. Moreover, in the case where the packet transmitted in the extension mode is the extended long packet that stores data to be transmitted as the payload in the existing CSI-2 standard, the interpretation unit 83 generates the optional extended packet footer arranged following the legacy payload in which data is stored and interprets the optional extended packet footer.

Then, for example, the interpretation unit 83 reads the in-vehicle row number, the source ID, and the like stored in the optional extended packet header, and outputs the read information to a subsequent LSI (not illustrated).

Note that, in a case where the extension mode detection flag supplied from the packet header detection unit 81 does not indicate the extension mode, that is, in a case where a packet having an existing packet structure is supplied, the interpretation unit 83 stops without performing the above-described processing.

The selection unit 84 selectively supplies data to the unpacking unit 87 on the basis of the packet structure of the existing packet or the packet structure of the extended packet according to the extension mode detection flag supplied from the packet header detection unit 81.

The selection unit 85 selectively supplies data to the CRC calculation unit 86 on the basis of the packet structure of the existing packet or the packet structure of the extended packet according to the extension mode detection flag supplied from the packet header detection unit 81.

The CRC calculation unit 86 calculates CRC of the packet header, the payload, the extended packet header, the optional extended packet header, or the optional extended packet footer selectively supplied via the selection unit 85. Then, in a case where a CRC error is detected, the CRC calculation unit 86 outputs a crc error detection signal indicating detection of the CRC error to a subsequent LSI (not illustrated).

The unpacking unit 87 performs unpacking processing of extracting the image data stored in the payload selectively supplied via the selection unit 84, and outputs the acquired image data to a subsequent LSI (not illustrated).

The CCI master 88 leads communication with the CCI slave 59 (FIG. 9) of the image sensor 21 on the basis of the CSI-2 standard.

The application processor 22 is configured in this manner, and can receive the extended packet transmitted from the image sensor 21, interpret the setting information stored in the extended packet header, the optional extended packet header, and the optional extended packet footer, and acquire the image data.

Communication Processing

Communication processing performed by the image sensor 21 and the application processor 22 will be described with reference to FIGS. 11 to 14.

Figure 11:
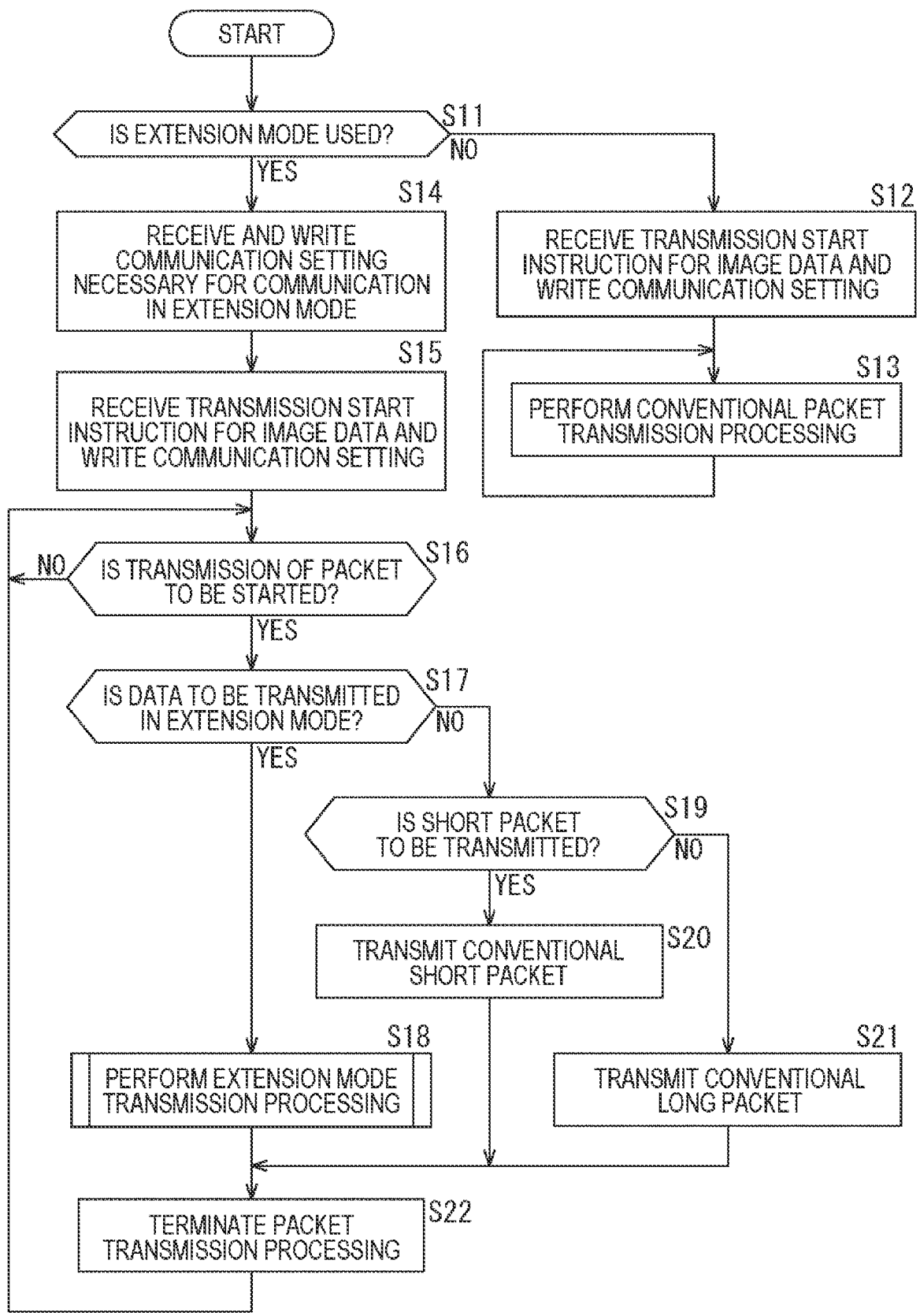
FIG. 11 is a flowchart for describing processing in which an image sensor transmits a packet.

FIG. 11 is a flowchart for describing processing in which the image sensor 21 transmits a packet.

For example, when the image sensor 21 is connected to the application processor 22 via the bus 23, the processing is started. In step S11, the controller 60 determines whether or not to use the extension mode in starting communication with the application processor 22. For example, the controller 60 checks the extension mode setting stored in the register 47 and determines to use the extension mode in the case where the extension mode setting indicating use of the extension mode is written by the application processor 22.

In the case where the controller 60 determines not to use the extension mode in step S11, the processing proceeds to step S12.

In step S12, the I2C/I3C slave 46 receives a transmission start instruction for the image data transmitted from the application processor 22 (in step S54 in FIG. 13 to be described below). Moreover, the I2C/I3C slave 46 receives the communication setting conforming to the CSI-2 standard transmitted together with the transmission start instruction, and writes the communication setting in the register 47 via the CCI slave 59.

In step S13, the image sensor 21 performs conventional packet transmission processing of transmitting the packet having the packet structure conforming to the existing CSI-2 standard to the application processor 22 on the basis of the communication setting stored in the register 47.

On the other hand, in the case where the controller 60 determines to use the extension mode in step S11, the processing proceeds to step S14.

In step S14, the I2C/I3C slave 46 receives the fixed communication setting (for example, copy of PH/PF for every lane at the time of GLD, or the like) required for communication in the extension mode, and writes the fixed communication setting in the register 47 via the CCI slave 59.

In step S15, the I2C/I3C slave 46 receives the transmission start instruction for the image data transmitted from the application processor 22 (in step S57 in FIG. 13 to be described below). Moreover, the I2C/I3C slave 46 receives the communication setting conforming to the CSI-2 standard transmitted together with the transmission start instruction, and writes the communication setting in the register 47 via the CCI slave 59.

In step S16, the controller 60 determines whether or not to start packet transmission, and waits until it is determined to start packet transmission.

Then, in step S16, in the case where it is determined to start packet transmission, the processing proceeds to step S17, and the controller 60 determines whether or not the data is to be transmitted in the extension mode. Here, in a case where the data is to be transmitted in a use case of an application example as described below, for example, the controller 60 determines that the data is to be transmitted in the extension mode, according to the content of the data to be transmitted.

In step S17, in the case where the controller 60 determines that the data is to be transmitted in the extension mode, the processing proceeds to step S18, and extension mode transmission processing of transmitting the extended packet corresponding to the extension mode (see FIG. 12) is performed.

On the other hand, in step S17, in the case where the controller 60 determines that the data is not to be transmitted in the extension mode, the processing proceeds to step S19.

In step S19, the controller 60 determines whether or not to transmit a short packet. For example, the controller 60 determines to transmit the short packet at the start of a frame and at the end of the frame.

In step S19, in the case where the controller 60 determines to transmit the short packet, the processing proceeds to step S20. In step 320, the packet header generation unit 52 generates the packet header and transmits the short packet having a conventional packet structure to the application processor 22.

On the other hand, in step 319, in the case where the controller 60 determines not to transmit the short packet (that is, to transmit the long packet), the processing proceeds to step S21. In step S21, the packing unit 51 stores the image data in the payload, and the CRC calculation unit 57 obtains the CRC, and generates the long packet having a conventional packet structure and transmits the long packet to the application processor 22.

After the processing of step S18, step S20, or step S21, the processing proceeds to step S22, and the controller 60 terminates the packet transmission processing. Thereafter, the processing returns to step 316, and processing of transmitting a packet for the next packet is similarly repeatedly performed.

Figure 12:
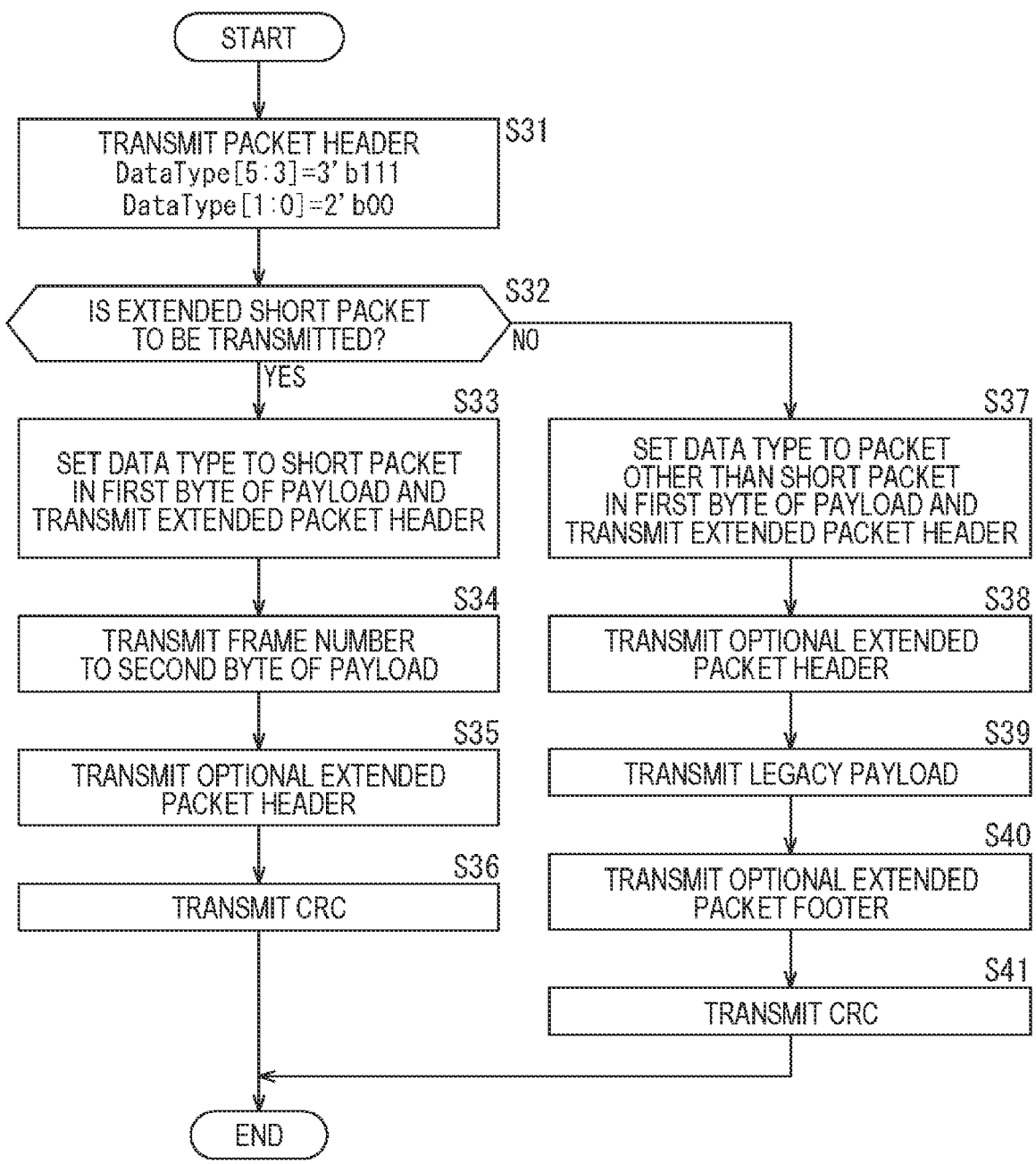
FIG. 12 is a flowchart for describing extension mode transmission processing.

FIG. 12 is a flowchart illustrating the extension mode transmission processing performed in the processing in step S18 in FIG. 11.

In step S31, the packet header generation unit 52 generates the packet header storing the VC, data type, WC, and the like, and transmits the packet header to the application processor 22. At this time, the packet header generation unit 52 writes the extension mode setting information (DataType[5:3]=3'b111) indicating that the mode is the extension mode and the extension type setting information (DataType[1:0]=2'b00) identifying that the mode setting of the extension mode is the extension mode 0 to the data type of the packet header.

In step S32, the application processor 22 determines whether or not to transmit the extended short packet. For example, the controller 60 determines to transmit the extended short packet at the start of the frame and at the end of the frame.

In step S32, in the case where the application processor 22 determines to transmit the extended short packet, the processing proceeds to step S33.

In step S33, the extended packet header generation unit 53 transmits the extended packet header in which the data type (DataType[7:0]) is set as the short packet in the first byte of the payload. At this time, the extended packet header generation unit 53 performs various settings (for example, OePH[7:0], OePF[3:0], and the like) stored in the extended packet header.

In step S34, the extended packet header generation unit 53 stores a frame number (FrameNumber: FN) in the second byte of the payload and transmits the payload.

In step S35, the extended packet header generation unit 53 generates and transmits the optional extended packet header as illustrated in FIG. 4 according to the setting (OePH[7:0]) performed in step S33.

In step S36, the CRC calculation unit 57 obtains CRC and transmits the CRC as the packet footer.

On the other hand, in step S32, in the case where the application processor 22 determines not to transmit the extended short packet (that is, to transmit the long packet), the processing proceeds to step S37.

In step S37, the extended packet header generation unit 53 transmits the extended packet header in which the data type (DataType[7:0]) is set as a packet other than the short packet in the first byte of the payload. At this time, the extended packet header generation unit 53 performs various settings (for example, OePH[7:0], OePF[3:0], and the like) stored in the extended packet header.

In step S38, the extended packet header generation unit 53 generates and transmits the optional extended packet header as illustrated in FIG. 5 according to the setting (OePH[7:0]) performed in step S37.

In step S39, the packing unit 51 packs the image data supplied from the image processing unit 43, and generates and transmits the legacy payload.

In step S40, the extended packet footer generation unit 54 generates and transmits the optional extended packet footer as illustrated in FIG. 4 according to the setting (OePF[3:0]) performed in step S37.

In step S41, the CRC calculation unit 57 obtains CRC and transmits the CRC as the packet footer.

Then, after the processing of step S36 or S41, the extension mode transmission processing is terminated.

As described above, the image sensor 21 can generate and transmit the extended short packet or the extended long packet.

Figure 13:
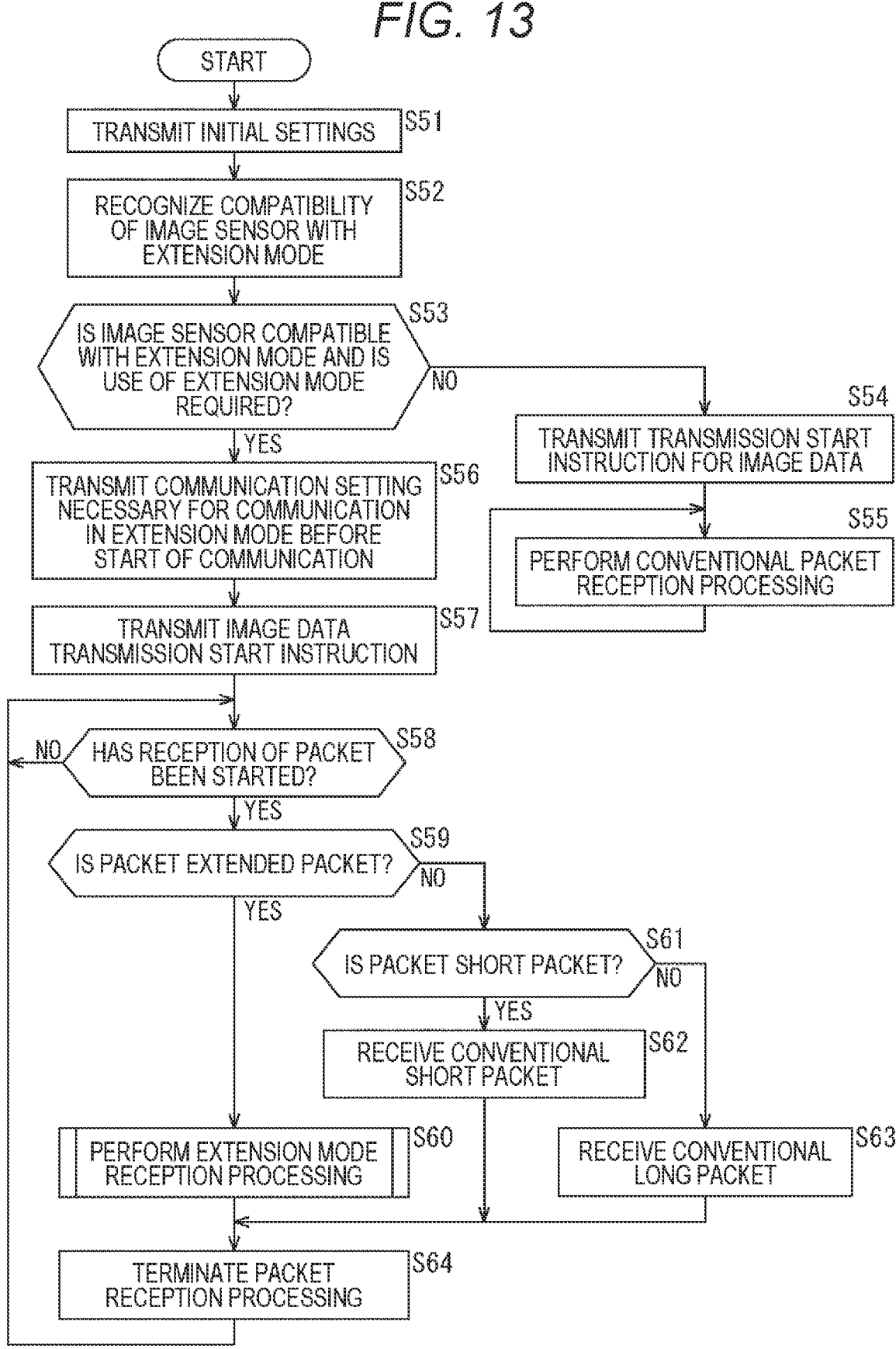
FIG. 13 is a flowchart for describing processing in which an application processor receives a packet.

FIG. 13 is a flowchart for describing processing in which the application processor 22 receives the packet.

For example, when the image sensor 21 is connected to the application processor 22 via the bus 23, the processing is started. In step S51, the controller 74 writes initial settings (for example, which one of C-PHY and D-PHY is used as the physical layer, and the like) of image sensor 21 into the register 73, and transmits the initial settings to the image sensor 21 by the I2C/I3C master 72 via the CCI master 88. Thereby, the initial settings are written in the register 47 of the image sensor 21.

In step S52, the controller 74 recognizes whether or not the image sensor 21 is compatible with the extension mode. For example, the controller 74 can recognize whether or not the image sensor 21 supports the extension mode by acquiring the set value (for example, the extended PH/PF-compatible capability) stored in the register 47 of the image sensor 21 by the I2C/I3C master 72. Alternatively, the controller 74 can recognize whether or not the image sensor 21 is compatible with the extension mode in advance on the basis of, for example, an input of a manual or the like.

In step S53, the controller 74 determines whether or not the image sensor 21 is compatible with the extension mode and whether or not the use of the extension mode is required by the application executed by the application processor 22.

In step S53, in a case where the controller 74 determines that the image sensor 21 is not compatible with the extension mode or the use of the extension mode is not required, the processing proceeds to step S54.

In step S54, the controller 74 causes I2C/I3C master 72 to transmit the transmission start instruction of the image data to the image sensor 21. At this time, the controller 74 causes the communication setting conforming to the CSI-2 standard to be transmitted.

In step S55, the application processor 22 performs conventional packet reception processing of receiving the packet having the packet structure conforming to the existing CSI-2 standard on the basis of the communication setting transmitted in step S54.

On the other hand, in step S53, in the case where the controller 74 determines that the image sensor 21 is compatible with the extension mode and the use of the extension mode is required by the application executed by the application processor 22, the processing proceeds to step S56.

In step S56, the I2C/I3C master 72 transmits the fixed communication setting required for communication in the extension mode before the communication in the extension mode is started. Thereby, the fixed communication setting is written in the register 47 of the image sensor 21 (step S14 in FIG. 11).

In step S57, the controller 74 causes I2C/I3C master 72 to transmit the transmission start instruction of the image data to the image sensor 21. At this time, the controller 74 causes the communication setting conforming to the CSI-2 standard to be transmitted.

In step S58, the packet header detection unit 81 determines whether or not the reception of the packet has been started by confirming the data supplied from the physical layer processing unit 71, and waits until it is determined that the reception of the packet has been started. For example, in the case of detecting the packet header from the data supplied from the physical layer processing unit 71, the packet header detection unit 81 determines that the reception of the packet has been started.

In step S58, in the case where the packet header detection unit 81 determines that the reception of the packet has been started, the processing proceeds to step S59.

In step S59, the packet header detection unit 81 checks the data type of the packet header detected in step S58, and determines whether or not the packet whose reception has been started is the extended packet compatible with the extension mode. Then, for example, in the case where the extension mode setting information indicates the extension mode in the data type of the packet header (DataType[5:3] =3'b111), the packet header detection unit 81 determines that the packet whose reception has been started is the extended packet.

In step S59, in the case where the packet header detection unit 81 determines that the packet whose reception has been started is the extended packet, the processing proceeds to step S60, and extension mode reception processing of receiving the extended packet (see FIG. 14) is performed.

On the other hand, in step S59, in the case where the packet header detection unit 81 determines that the packet whose reception has been started is not the extended packet, the processing proceeds to step S61.

In step S61, the packet header detection unit 81 checks the data type (DataType[5:0]) of the packet header detected in step S58, and determines whether or not the packet whose reception has been started is the short packet.

In step S61, in the case where the packet header detection unit 81 determines that the packet whose reception has been started is the short packet, the processing proceeds to step S62. In step S62, the packet header detection unit 81 receives the short packet having a conventional packet structure transmitted from the image sensor 21.

On the other hand, in step S61, in the case where the packet header detection unit 81 determines that the packet whose reception has been started is not the short packet (that is, the reception of the long packet has been started), the processing proceeds to step S63. In step S63, the unpacking unit 87 receives the payload of the long packet having a conventional packet structure transmitted from the image sensor 21 and extracts the image data, and the CRC calculation unit 86 receives the (WC+1)th byte transmitted following the packet header as the CRC.

After the processing of step S60, step S62, or step S63, the processing proceeds to step S64, and the controller 74 terminates the packet reception processing. Thereafter, the processing returns to step S58, and processing of receiving a packet for the next packet is similarly repeatedly performed.

Figure 14:
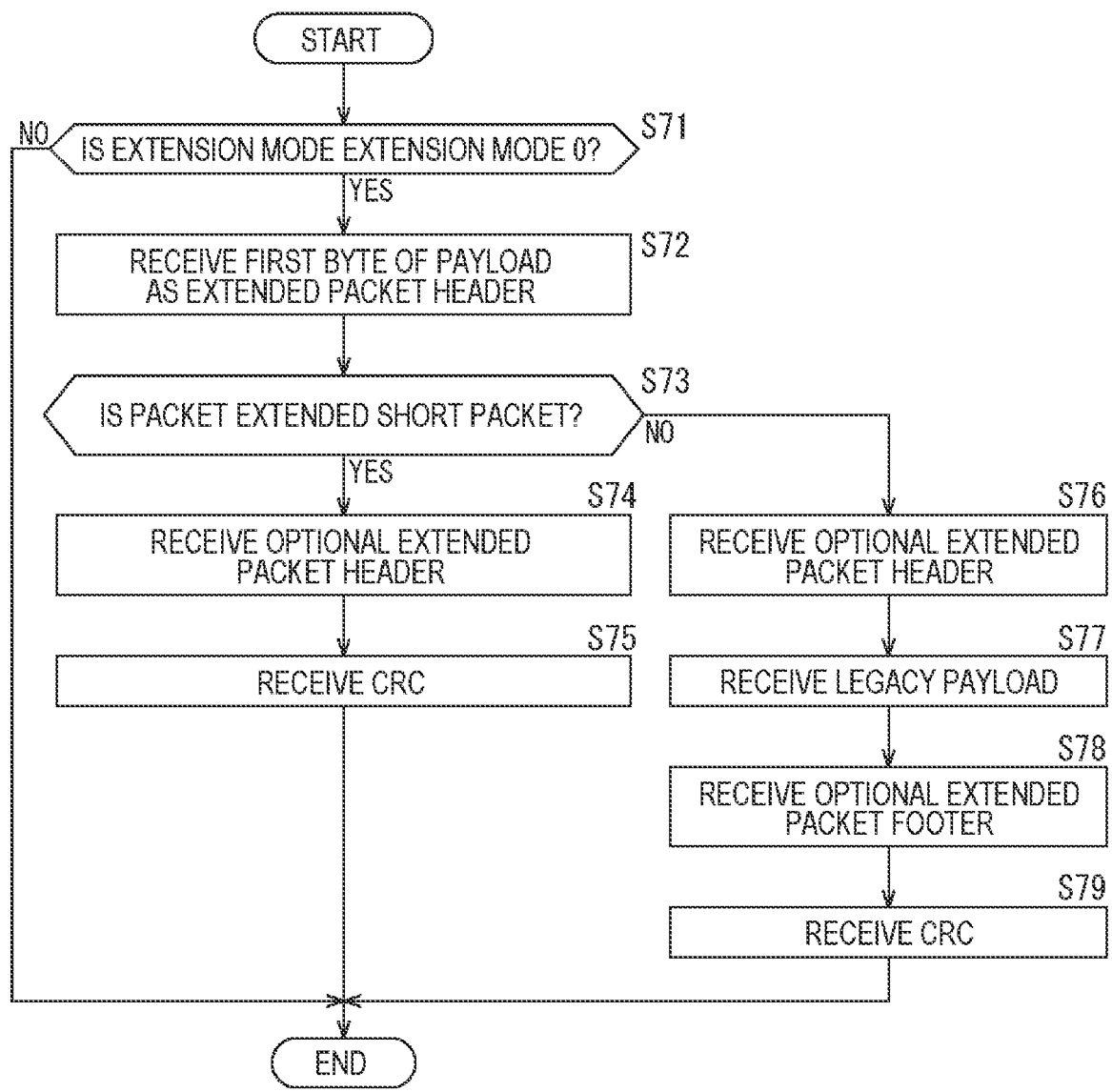
FIG. 14 is a flowchart for describing extension mode reception processing.

FIG. 14 is a flowchart illustrating the extension mode reception processing performed in the processing of step S60 of FIG. 13.

In step S71, the packet header detection unit 81 determines whether or not the mode setting of the extension mode is the extension mode 0. For example, in the case where the extension type setting information indicates the extension mode 0 in the data type of the packet header (DataType[1: 0]=2'b00), the packet header detection unit 81 determines that the mode setting of the extension mode is the extension mode 0.

In step S71, in the case where the packet header detection unit 81 determines that the mode setting of the extension mode is the extension mode 0, the processing proceeds to step S72. In step S72, the interpretation unit 83 receives the first byte of the payload as the extended packet header.

In step S73, the interpretation unit 83 checks the data type (DataType[7:0]) of the extended packet header received in step S72, and determines whether or not the packet whose reception has been started is the extended short packet.

In step S73, in a case where the interpretation unit 83 determines that the packet is the extended short packet, the processing proceeds to step S74. In step S74, the interpretation unit 83 receives the optional extended packet header according to the setting (OePH[7:0]) stored in the extended packet header received in step S72.

In step S75, the CRC calculation unit 86 receives the (WC+1)th byte transmitted following the optional extended packet header as the CRC.

On the other hand, in step S73, in the case where the interpretation unit 83 determines that the packet is not the extended short packet (that is, the reception of the extended long packet has been started), the processing proceeds to step S76. In step S76, the interpretation unit 83 receives the optional extended packet header according to the setting (OePH[7:0]) stored in the extended packet header received in step S72.

In step S77, the unpacking unit 87 receives the legacy payload of the extended long packet transmitted from the image sensor 21 and extracts the image data.

In step S78, the interpretation unit 83 receives the optional extended packet footer according to the setting (OePF[3:0]) stored in the extended packet header received in step S72.

In step S79, the CRC calculation unit 86 receives the (WC+1)th byte transmitted following the optional extended packet footer as the CRC.

Then, in step S71, in the case where it is determined that the mode setting of the extension mode is not the extension mode 0, the extension mode reception processing is terminated after the processing of step S75 or after the processing of step S79.

As described above, the application processor 22 can acquire data by receiving the extended short packet or the extended long packet.

Second Structure Example of Packet Structure

A second structure example of the packet structure of the packet used for communication between the extension mode-compatible CSI-2 transmission circuit 31 and the extension mode-compatible CSI-2 reception circuit 32 will be described with reference to FIGS. 15 to 18.

In the first structure example illustrated in FIGS. 3 to 8, the packet header and the packet footer have the same packet structure as those of the existing CSI-2 standard, placing a significance on maintaining compatibility with the existing CSI-2 standard, and the packet structure is extended by the extended packet header, the optional extended packet header, and the optional extended packet footer. Meanwhile, in the second structure example to be described below, the packet header and the packet footer are different from those of the existing CSI-2 standard, and the packet structure is extended by the extended packet header and the extended packet footer.

Figure 15:
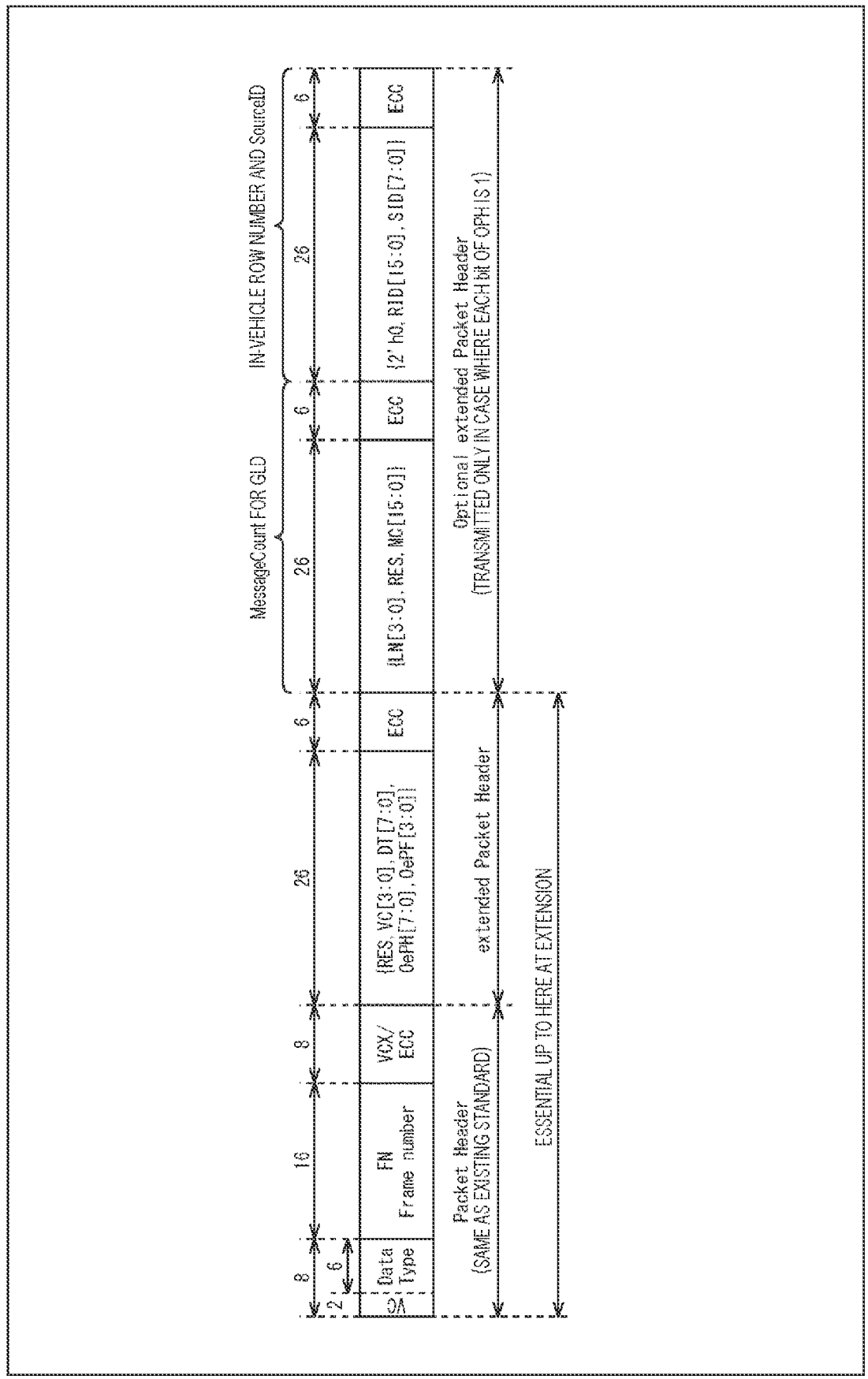
FIG. 15 is a diagram illustrating a second structure example of an overall packet structure of an extended packet for D-PHY.

FIG. 15 illustrates a packet structure of a short packet (hereinafter an extended short packet for D-PHY) used in the extension mode of CSI-2 in the case where the physical layer is D-PHY.

In the extended short packet for D-PHY illustrated in FIG. 15, the extension mode is identified by the data type stored in the same packet header as that of the existing CSI-2 standard, similarly to the extended short packet for D-PHY of the first structure example illustrated in FIG. 4.

Meanwhile, in the extended short packet for D-PHY illustrated in FIG. 15, the frame number is stored in a short packet data field in the next sixteen bits of the data type of the packet header, similarly to the short packet conforming to the existing CSI-2 standard. Then, following the packet header, an extended packet header configured similarly to the extended packet header illustrated in FIG. 4 is transmitted.

Therefore, the application processor 22 on the reception side can interpret the data type stored in the extended packet header and determine that the frame number is stored in the data field of the packet header in the case where the packet is the extended short packet.

Note that the optional extended packet header in the extended short packet for D-PHY illustrated in FIG. 15 is configured similarly to the optional extended packet header in the extended short packet for D-PHY of the first structure example illustrated in FIG. 4. However, since the optional extended packet header has a packet structure that is not embedded in the payload, it is not necessary to add CRC at the end.

Figure 16:
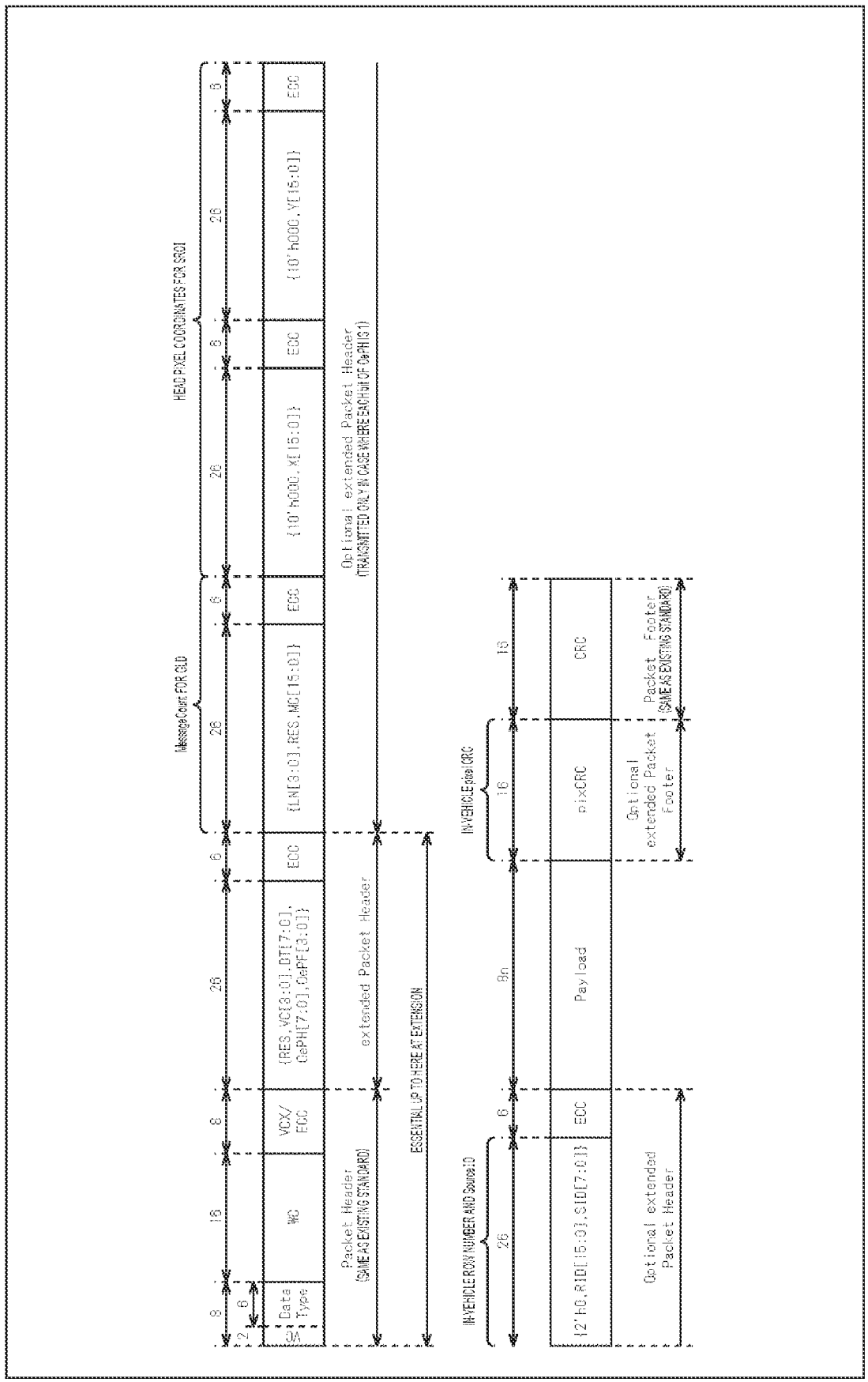
FIG. 16 is a diagram illustrating a second structure example of a packet structure of an extended long packet for D-PHY.

FIG. 16 illustrates a packet structure of a long packet (hereinafter an extended long packet for D-PHY) used in the extension mode of CSI-2 in the case where the physical layer is D-PHY.

In the extended long packet for D-PHY illustrated in FIG. 16, the extension data is transmitted as a part of the packet header or of the packet footer without being embedded in the payload. Therefore, WC of the head packet header merely indicates the byte length of the payload, similarly to the existing standard.

Figure 17:
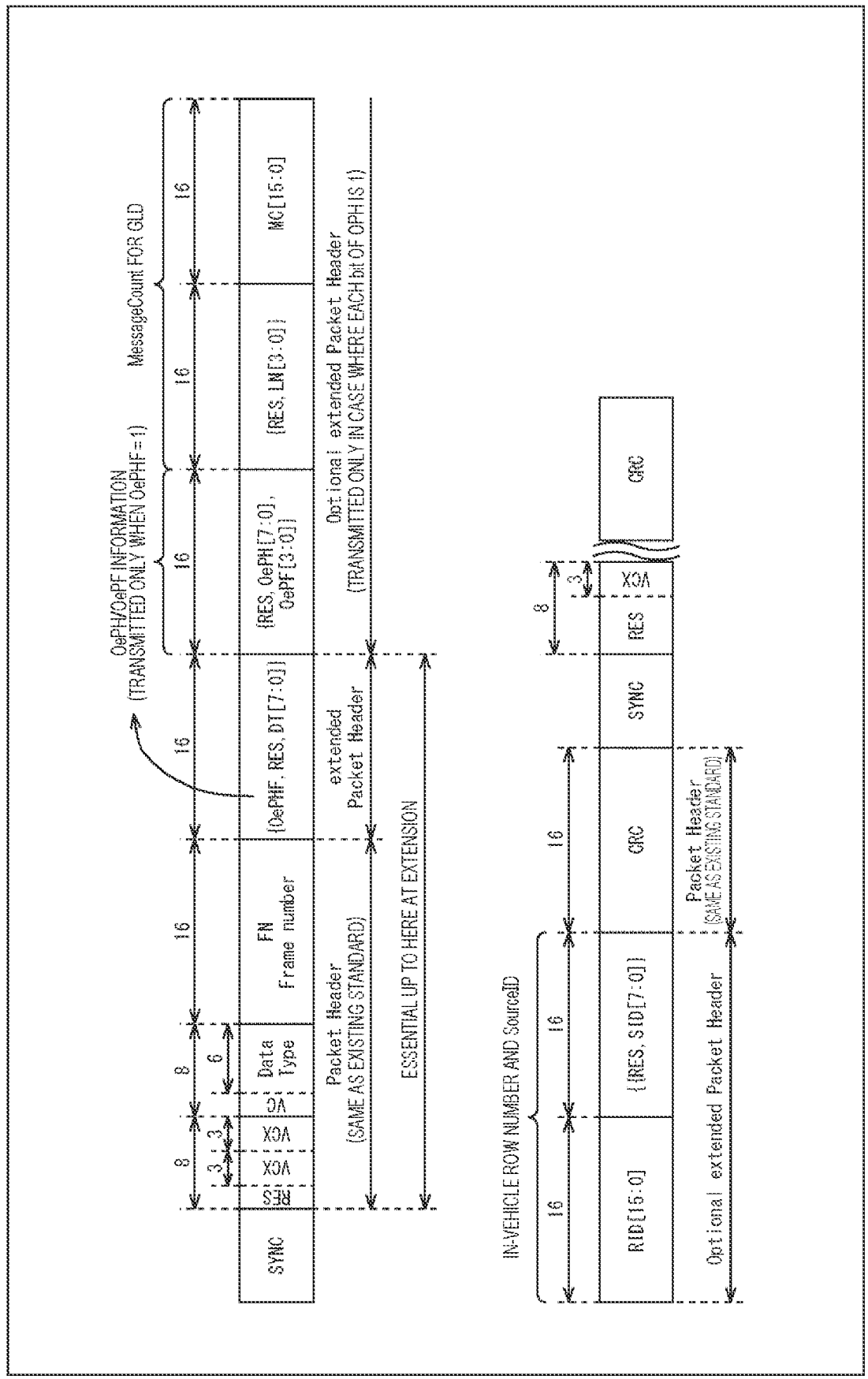
FIG. 17 is a diagram illustrating a second structure example of a packet structure of an extended short packet for C-PHY.

FIG. 17 illustrates a packet structure of a short packet (hereinafter an extended short packet for C-PHY) used in the extension mode of CSI-2 in the case where the physical layer is C-PHY.

Since the extended portion in the extended short packet for C-PHY illustrated in FIG. 17 is transmitted as extension of the packet header conforming to the existing CSI-2 standard, the extended portion such as the extended packet header is inserted after the frame number. Then, the packet header ends with CRC, similarly to the existing CSI-2 standard. Moreover, the packet structure by which the packet header is transmitted twice with SYNC interposed is similar to the short packet conforming to the existing CSI-2 standard.

Figure 18:
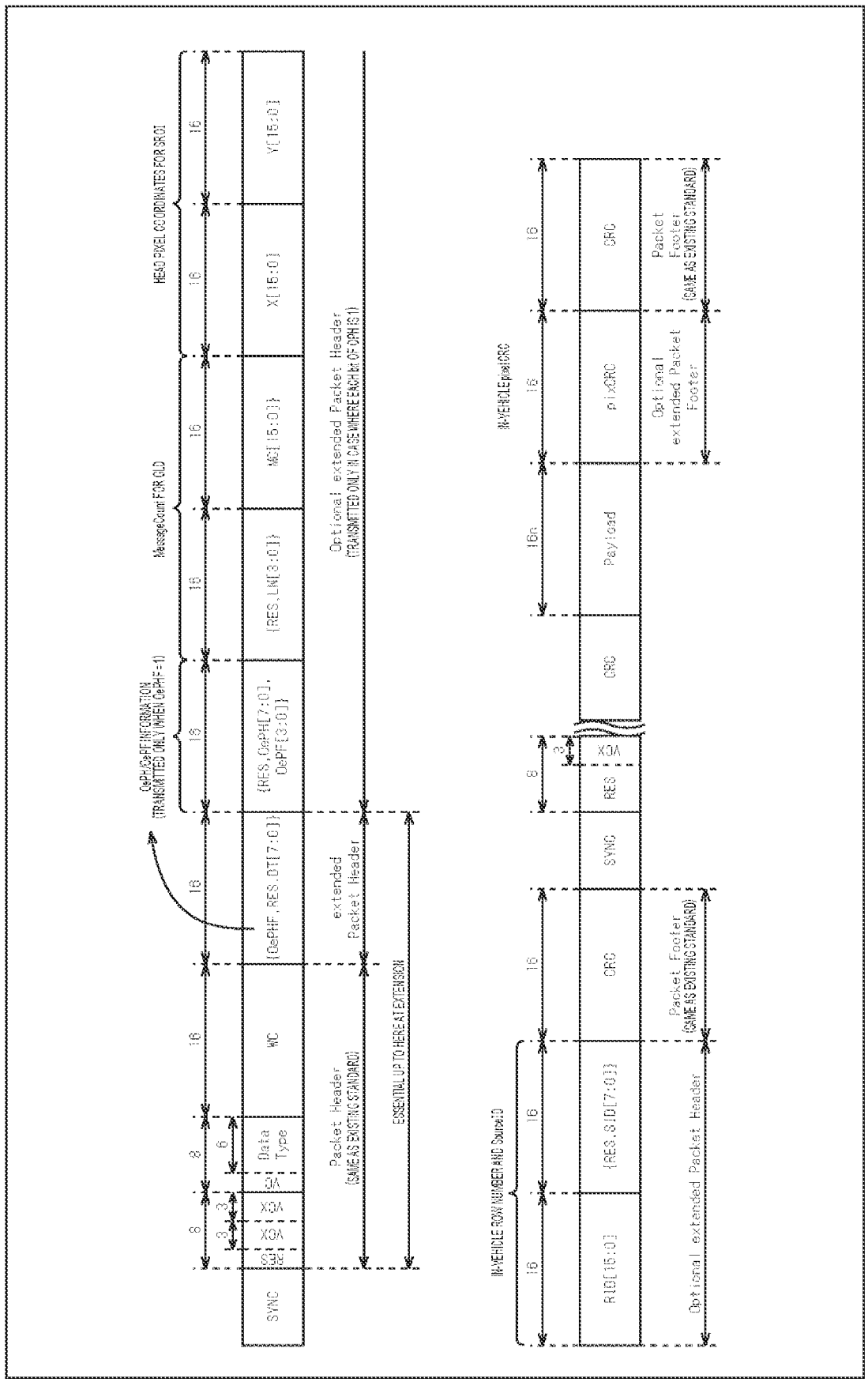
FIG. 18 is a diagram illustrating a second structure example of a packet structure of an extended long packet for C-PHY.

FIG. 18 illustrates a packet structure of a long packet (hereinafter an extended long packet for C-PHY) used in the extension mode of CSI-2 in the case where the physical layer is C-PHY.

As described above, the extended long packet for C-PHY illustrated in FIG. 18 is different from the extended long packet for C-PHY of the first structure example illustrated in FIG. 8 in that WC of the head packet header merely indicates the byte length of the payload, similarly to the existing standard.

As described above, with the packet structure of the extended packet of the second structure example illustrated in FIGS. 15 to 18, it is possible to support various uses as compared with conventional structures, similarly to the packet structure (FIGS. 3 to 8) of the extended packet of the first structure example.

Note that the extended packet of the second structure example has a packet structure in which the existing packet header and footer are extended without the extension data being embedded in the existing payload. Therefore, in the case of adopting the packet structure of the extended packet of the second structure example, it is not possible to minimize the influence that a change is required from a conventionally used communication system, as compared with the case of adopting the packet structure of the extended packet of the first structure example. That is, for example, the existing SerDes transmission circuit 34 needs to be changed with respect to the SerDes reception circuit 35 (FIG. 2).

As described above, by adopting the extended packet of the first structure example, it is possible to support various uses such as in-vehicle use, and it is possible to construct an in-vehicle system while minimizing the influence that a change is required from the conventionally used communication system.

Furthermore, by adopting the extended packet of the second structure example, it is possible to support various uses such as in-vehicle use although a change is required from the conventionally used communication system.

Modification of Image Sensor and Application Processor

A modification of the image sensor and the application processor will be described with reference to FIG. 19.

Each block constituting the image sensor 21 in FIG. 9 or the application processor 22 in FIG. 10 described above is configured to be able to perform processing corresponding to both the packet for D-PHY and the packet for C-PHY. In contrast, for example, both a block for exclusively processing the packet for D-PHY and a block for exclusively processing the packet for C-PHY may be provided, and the processing may be switched in each block.

Figure 19:
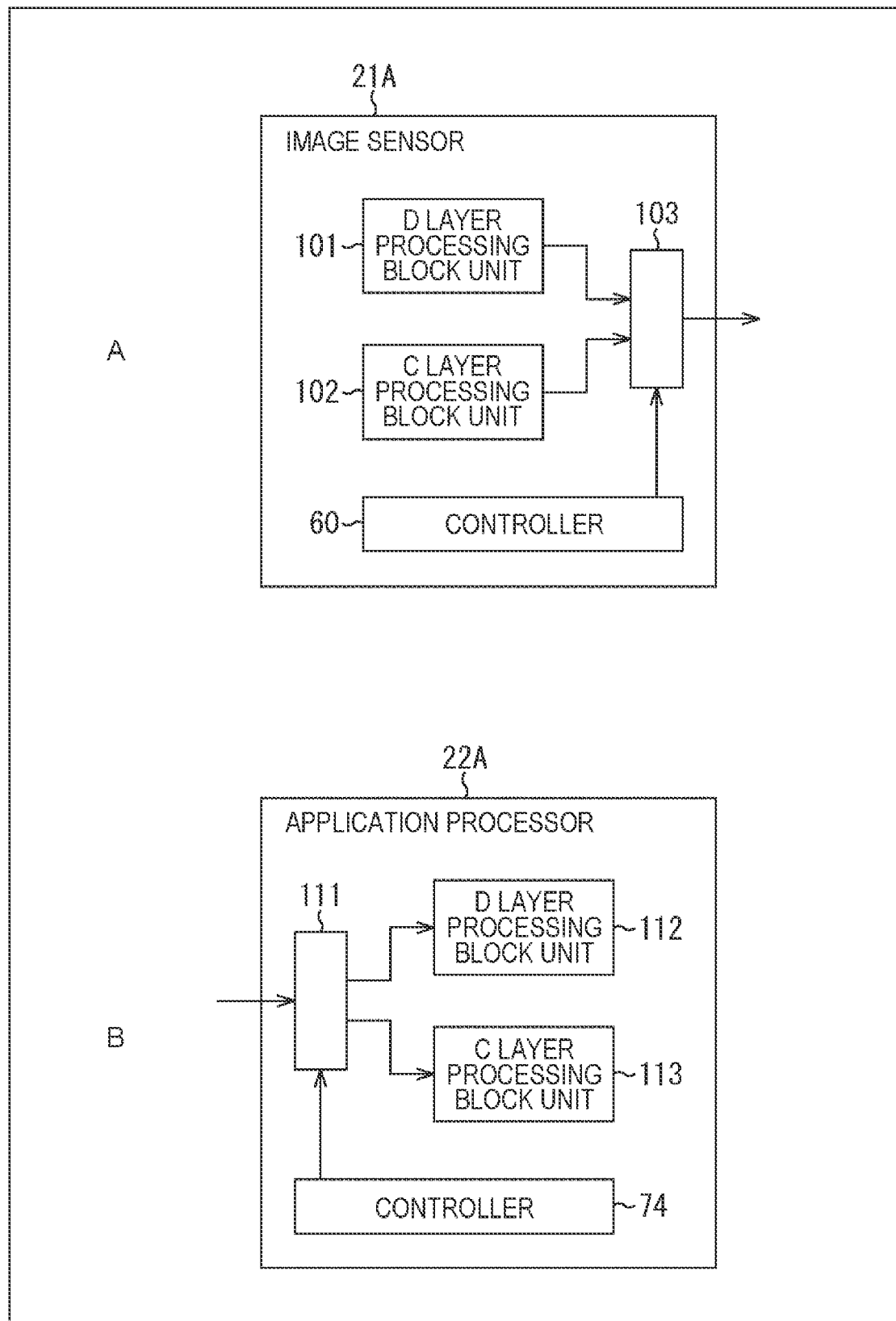
FIG. 19 is a block diagram illustrating a modification of a configuration for switching D-PHY and C-PHY.

An image sensor 21A illustrated in A of FIG. 19 includes a D layer processing block unit 101, a C layer processing block unit 102, a switching unit 103, and a controller 60.

The D layer processing block unit 101 includes a block that exclusively performs processing of the packet for D-PHY among blocks constituting the image sensor 21 in FIG. 9. The C layer processing block unit 102 includes a block that exclusively performs processing of the packet for C-PHY among blocks constituting the image sensor 21 in FIG. 9. The switching unit 103 performs switching so as to output the packet for D-PHY generated in the D layer processing block unit 101 in the case of using the D-PHY for the physical layer, and to output the packet for C-PHY generated in the C layer processing block unit 102 in the case of using the C-PHY for the physical layer under the control of the controller 60.

An application processor 22A illustrated in B of FIG. 19 includes a switching unit 111, a D layer processing block unit 112, a C layer processing block unit 113, and a controller 74.

The switching unit 111 performs switching so as to supply the packet transmitted from the image sensor 21A to one of the D layer processing block unit 112 and the C layer processing block unit 113 under the control of the controller 74. The D layer processing block unit 112 includes a block that exclusively performs processing of the packet for D-PHY among blocks constituting the application processor 22 in FIG. 10. The C layer processing block unit 113 includes a block that exclusively performs processing of the packet for C-PHY among blocks constituting the application processor 22 in FIG. 10.

In the image sensor 21A and the application processor 22A configured as described above, a physical layer to be used can be set between the controller 60 and the controller 74 before communication is started. Then, for example, in the case of using the D-PHY for the physical layer, the packet for D-PHY generated in the D layer processing block unit 101 is transmitted via the switching unit 103, supplied to the D layer processing block unit 112 via the switching unit 111, and processed. Furthermore, for example, in the case of using C-PHY for the physical layer, the packet for C-PHY generated in the C layer processing block unit 102 is transmitted via the switching unit 103, supplied to the C layer processing block unit 113 via the switching unit 111, and processed.

Application Example of Extended Packet

Application of the above-described extended packet to, for example, the following use cases has been examined.

For example, application of the extended packet to a use case of transmitting a higher-definition image (RAW24) has been examined.

For example, when image data is transmitted in RAW format, RAW6, RAW7, RAW8, RAW10, RAW12, RAW14, RAW16, and RAW20 are defined as the data types to be stored in the packet header conforming to the existing CSI-2 standard. Meanwhile, in recent years, transmission of a higher-definition image is expected in order to support automated driving using an in-vehicle camera. Therefore, by extending the bit depth of the data type by applying the extended packet, it is possible to define higher-definition RAW24 as the data type of the extended packet header, for example.

Furthermore, application of the extended packet to SmartROI that is a technique for transmitting only an image region of interest on a screen has been examined.

For example, a large number of cameras is currently installed in a stadium, an airport, or the like. In a case where the entire images captured by these cameras are transmitted from the cameras to a cloud server via a network such as the Internet, it is assumed that a band shortage of the Internet, an increase in calculation amount or data amount on the cloud side, or the like. Therefore, by cutting out only the image region of interest at an edge (camera side) and transmitting the image region of interest, it is expected to suppress the band shortage on the Internet, the increase in calculation amount or data amount on the cloud side, or the like.

In the case of transmitting such an SROI, it is necessary to transmit upper left coordinates of a rectangular region (ROI) together in order to notify the reception side which part on the entire screen the image region of interest corresponds to. Furthermore, it is necessary to transmit data of the entire imaging screen at predetermined timing by an instruction from the reception side. Therefore, for example, the SROI image and the data of the entire image (existing packet header) are mixed in units of frames.

Therefore, by applying the extended packet, for example, coordinate data of sixteen bits or more of each of an X coordinate and a Y coordinate can be transmitted.

Moreover, a use case of applying the extended packet GLD that continues communication by reducing the band and the number of lanes even in a case where channel deterioration occurs is examined. Note that GLD is a proposal examined in CSI-2 ver3.0.

For example, in automated driving, even if a part of a cable connecting cameras is disconnected at the time of collision, it is required to continue communication using a cable that is not disconnected, automatically retreat to a safety zone, and then stop a vehicle. Therefore, an in-vehicle camera interface has at least a disconnection detection function, and information such as a row number (sixteen bits) indicating information of which row on the screen, SourceID (eight bits) indicating which camera has transmitted the information, and a message counter (sixteen bits) indicating a transmission number is required. Moreover, in a case of being used in combination with the SROI as described above, it is conceivable that these pieces of information are transmitted in units of frames.

Therefore, by applying the extended packet, these pieces of information can be transmitted.

Configuration Example Adapted to E2E Protection

A configuration example adapted to a rule for prohibiting packet modification and the like on a transmission path will be described with reference to FIGS. 20 to 26.

For example, in the communication system 11A having the configuration described with reference to FIG. 2, in a case where interfaces are different between the image sensor 21 and the application processor 22, the packet needs to be converted on the transmission path. That is, in a case where the physical layer of the image sensor 21 is D-PHY and the physical layer of the application processor 22 is C-PHY, for example, the deserializer 26 needs to convert the packet for D-PHY into the packet for C-PHY.

As described above, in the configuration in which the packet conversion is performed in the deserializer 26, for example, the provision defined by ISO 26262 (Functional Safety), that is, the provision prohibiting packet modification and the like on the transmission path (Hereinafter, referred to as E2E (End-to-End) protection) is violated.

Figure 20:
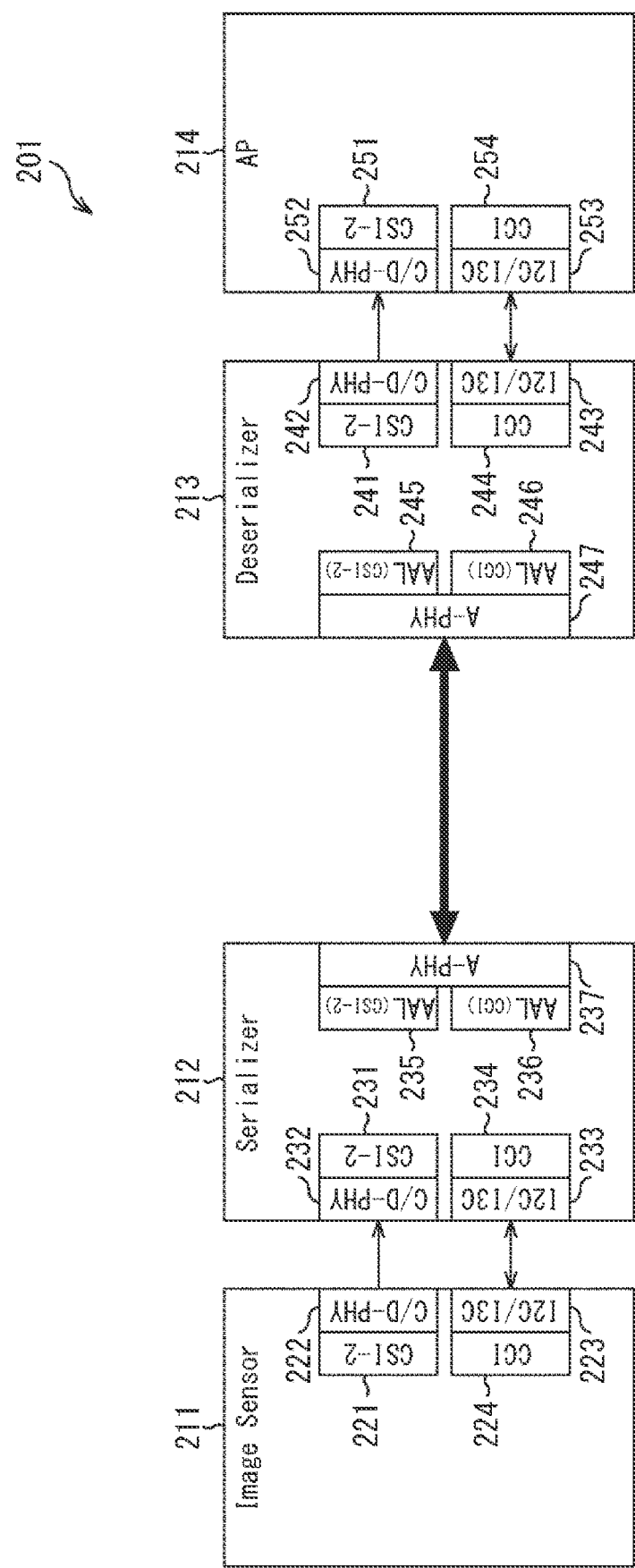
FIG. 20 is a block diagram illustrating a configuration example of a third embodiment of a communication system to which the present technology is applied.

FIG. 20 is a block diagram illustrating a configuration example of a communication system 201 adapted to E2E protection as a third embodiment of the communication system to which the present technology is applied.

As illustrated in FIG. 20, the communication system 201 is configured by connecting an image sensor 211, a serializer 212, a deserializer 213, and an application processor 214. Note that FIG. 20 illustrates a case where SERDES is A-PHY as an example, and cases of connection using other SERDES standards such as FPD-LINK 3 are also included. In addition, in the SERDES standard, communication may be performed on the basis of the SERDES standard while maintaining the format of the CIS-2 (at least application specific payload). Furthermore, in SERDES, physical layer processing units 237 and 247 may include a plurality of physical layer processing units of other SERDES standards in addition to A-PHY, and the physical layer processing units can be switched according to the application.

The image sensor 211 includes at least an extension mode-compatible CSI-2 transmission circuit 221, a physical layer processing unit (hereinafter referred to as a C/D-PHY physical layer processing unit) 222 corresponding to C-PHY or D-PHY or both, a slave (hereinafter referred to as an I2C/I3C slave) 223 corresponding to I2C or I3C or both, and a CCI slave 224.

The serializer 212 includes at least a CSI-2 reception circuit 231, a C/D-PHY physical layer processing unit 232, an I2C/I3C master 233, a CCI master 234, an A-PHY packet for CSI-2 generation unit 235, an A-PHY packet for CCI transmission/reception unit 236, and a physical layer processing unit 237 compatible with A-PHY. For example, in the serializer 212, a packet for C-PHY or D-PHY is converted into a packet for A-PHY, and this conversion is determined on the basis of register setting or the like.

The deserializer 213 includes at least a CSI-2 transmission circuit 241, a C/D-PHY physical layer processing unit 242, an I2C/I3C slave 243, a CCI slave 244, an A-PHY packet for CSI-2 reception unit 245, a A-PHY packet for CCI transmission/reception unit 246, and a physical layer processing unit 247 compatible with the A-PHY. For example, in the deserializer 213, the packet for A-PHY is converted into the packet for C-PHY or D-PHY, and this conversion is determined on the basis of register setting or the like.

The application processor 214 includes at least an extension mode-compatible CSI-2 reception circuit 251, a C/D-PHY physical layer processing unit 252, an I2C/I3C master 253, and a CCI master 254.

The communication system 201 is configured in this manner, and an extended packet having the above-described structure is transmitted from the image sensor 211 and received by the application processor 214. Here, when the communication system 201 is configured such that the physical layer processing unit 222 of the image sensor 211 is compatible with D-PHY and the physical layer processing unit 252 of the application processor 22 is compatible with C-PHY, it is necessary not to violate E2E protection.

Therefore, the communication system 201 limits a protection range of E2E protection to an application specific payload (hereinafter referred to as an AS payload), which is a payload specific to an application, so as to be adapted to E2E protection. That is, the AS payload is prohibited from being changed at the time of conversion from the packet for A-PHY into the packet for C-PHY or for D-PHY or at the time of conversion from the packet for C-PHY or for D-PHY into the packet for A-PHY.

Figure 21:
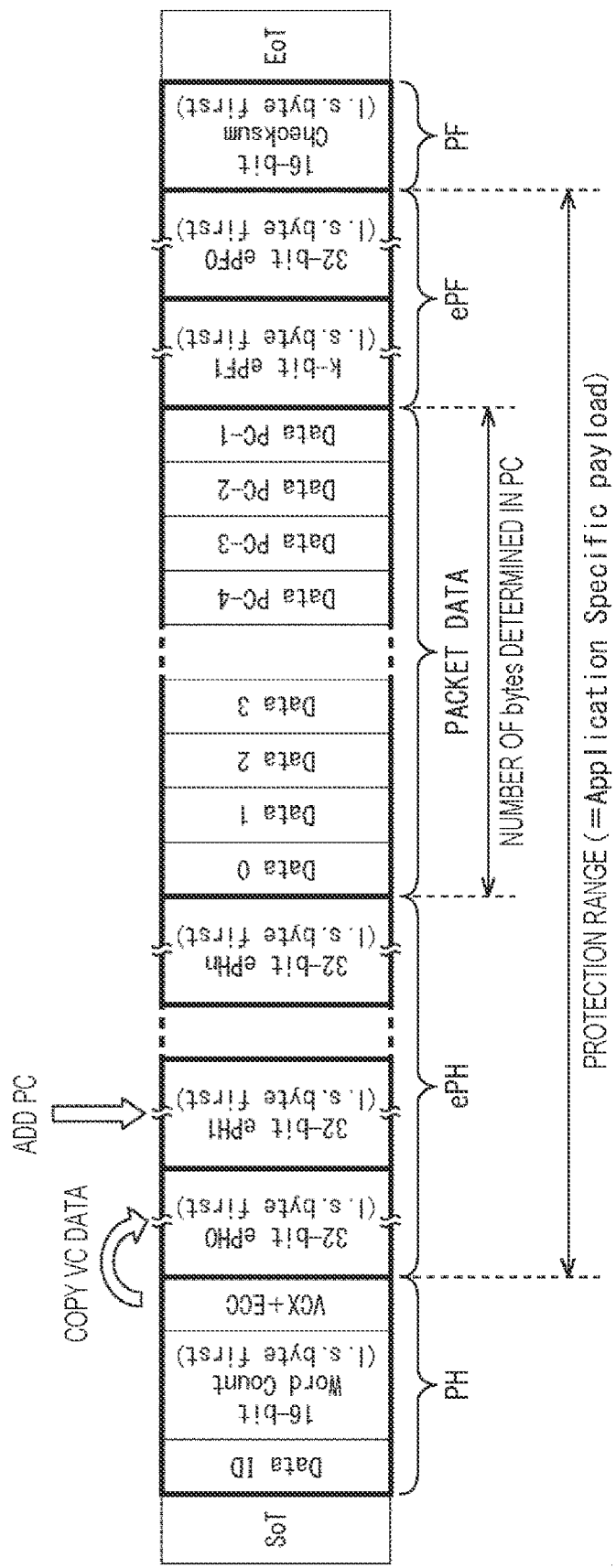
FIG. 21 is a diagram illustrating a structure example of an extended packet for D-PHY corresponding to a rule of packet modification prohibition.

FIG. 21 illustrates a structure example of the extended packet for D-PHY extended to be compatible with E2E protection.

As illustrated, in the extended packet for D-PHY, the AS payload including an extended packet header (ePH), packet data, and an extended packet footer (ePF) is limited as the protection range of E2E protection.

Then, in the extended packet header, predetermined information necessary in a case where the protection range of E2E protection is limited to the AS payload is described. For example, a packet count PC indicating a data length of data stored in the AS payload is added as the predetermined information described in the extended packet header so as to identify the data length of the packet data. That is, the packet data has the number of bytes determined by the packet count PC. Furthermore, a virtual channel VC indicating the number of lines of virtual channels is copied from an existing packet header as the predetermined information described in the extended packet header.

Figure 22:
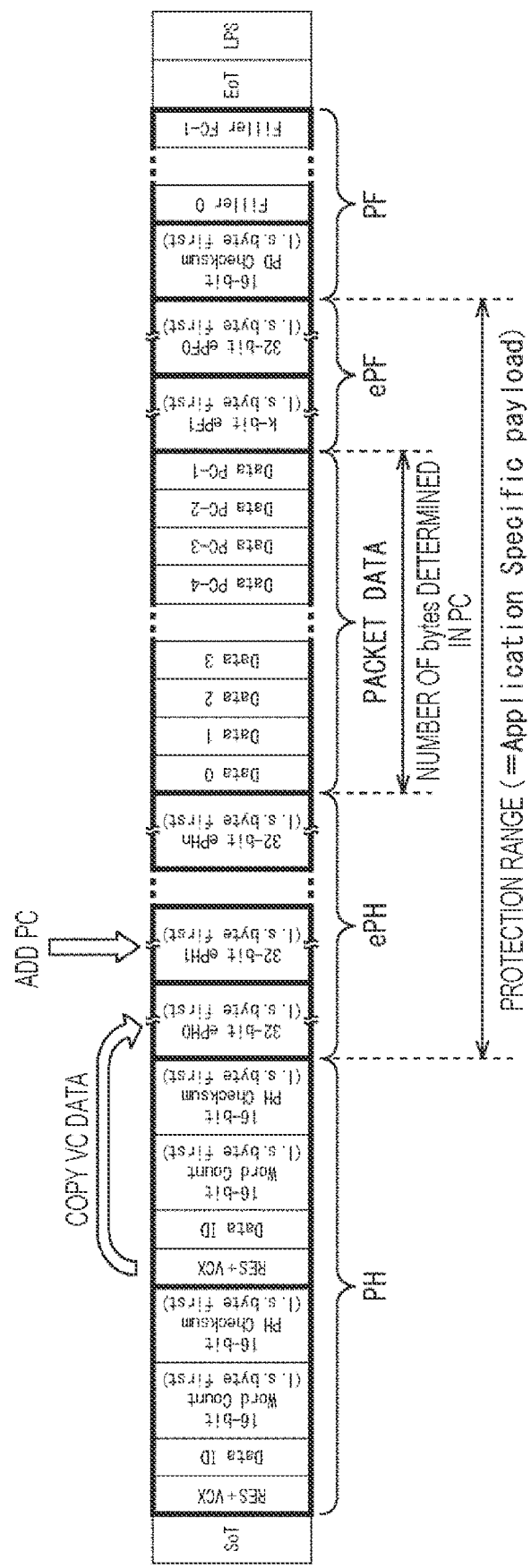
FIG. 22 is a diagram illustrating a structure example of an extended packet for C-PHY corresponding to a rule of packet modification prohibition.

FIG. 22 illustrates a structure example of the extended packet for C-PHY extended to be compatible with E2E protection.

As illustrated, in the extended packet for C-PHY, the AS payload including an extended packet header (ePH), packet data, and an extended packet footer (ePF) is limited as the protection range of E2E protection, similarly to the extended packet for D-PHY. Then, the packet count PC and the virtual channel VC are described in the extended packet header as the predetermined information necessary in the case where the protection range of E2E protection is limited to the AS payload, similarly to the extended packet for D-PHY.

Figure 23:
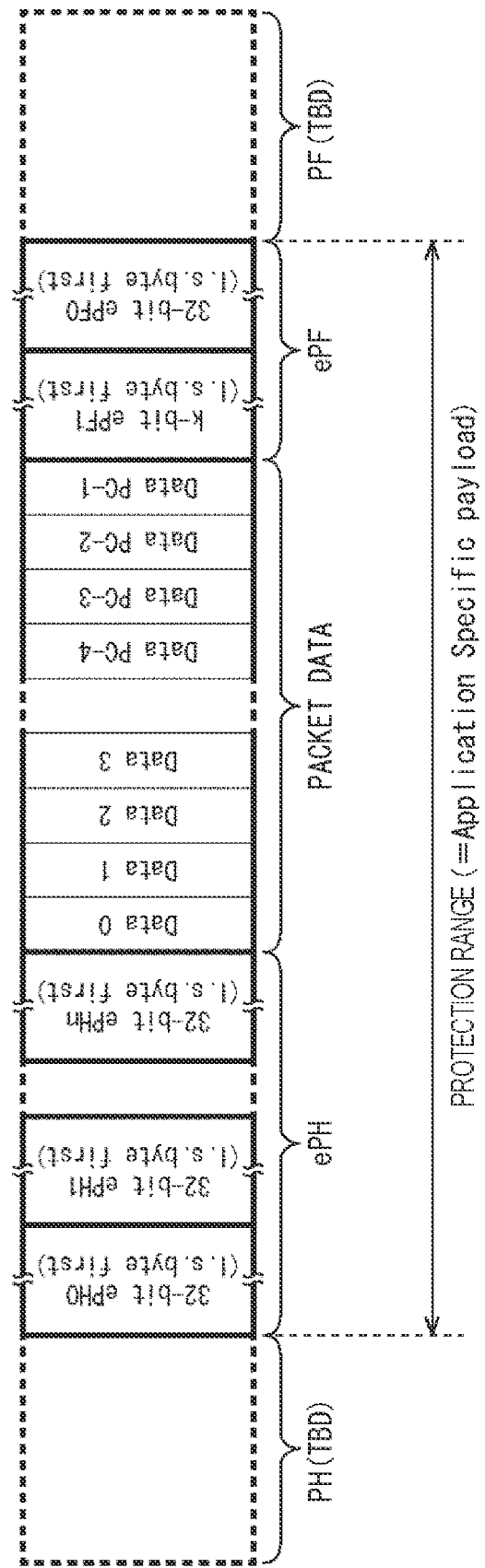
FIG. 23 is a diagram illustrating a structure example of an extended packet for A-PHY corresponding to a rule of packet modification prohibition.

FIG. 23 illustrates a structure example of the extended packet for A-PHY extended to be compatible with E2E protection.

As illustrated, even in the extended packet for A-PHY, the AS payload including an extended packet header (ePH), packet data, and an extended packet footer (ePF) is limited as the protection range of E2E protection.

Here, as described with reference to FIG. 20, the communication system 201 generates the extended packet for A-PHY from the extended packet for D-PHY or C-PHY transmitted from the image sensor 211 to the serializer 212.

Therefore, the packet count PC and the virtual channel VC are already described in the extended packet header of the extended packet for A-PHY.

By adopting such a packet structure, the communication system 201 can avoid modification of the AS payload on the transmission path and can observe E2E protection. Note that the packet structures illustrated in FIGS. 21 to 23 can be used by being partially replaced with corresponding packets of the packet structures as illustrated in FIGS. 3 to 8 and FIGS. 15 to 18, and a part of packet generation is replaced.

Figure 24:
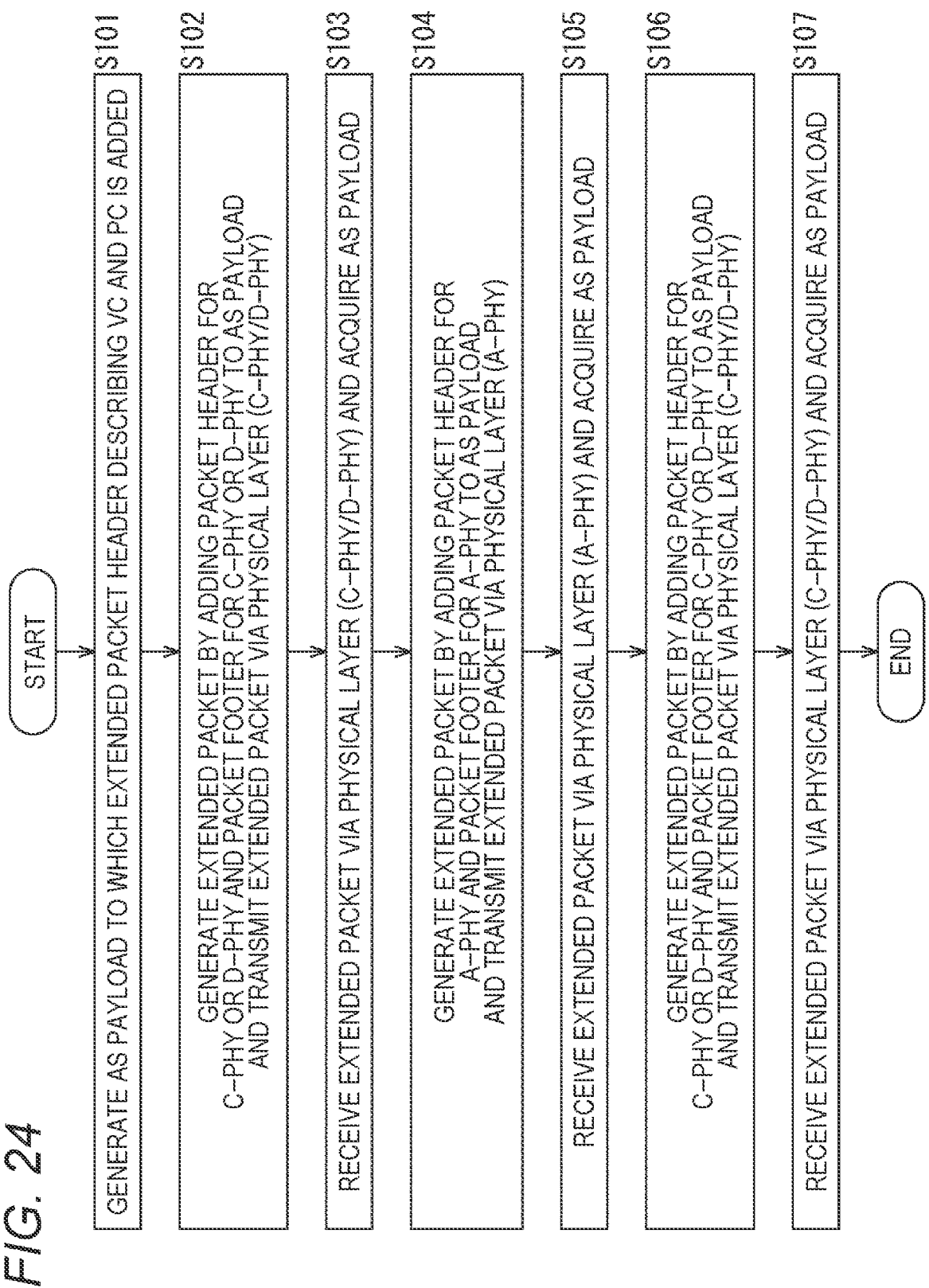
FIG. 24 is a flowchart for describing packet transmission/reception processing adapted to the rule of packet modification prohibition.

FIG. 24 is a flowchart for describing packet transmission/reception processing adapted to E2E protection.

For example, when data (for example, image data or the like) stored in the packet data is supplied to the extension mode-compatible CSI-2 transmission circuit 221, the processing is started. Then, in step S101, in the image sensor 211, the extension mode-compatible CSI-2 transmission circuit 221 stores the supplied data in the packet data. Moreover, the extension mode-compatible CSI-2 transmission circuit 221 generates the extended packet header describing the virtual channel VC and the packet count PC as illustrated in FIG. 21 or 22. Then, the extension mode-compatible CSI-2 transmission circuit 221 generates the AS payload by adding the extended packet header and the extended packet footer to the packet data.

In step S102, the extension mode-compatible CSI-2 transmission circuit 221 generates the extended packet for C-PHY or D-PHY by adding the packet header for C-PHY or D-PHY and the packet footer for C-PHY or D-PHY to the AS payload generated in step S101. Then, the extension mode-compatible CSI-2 transmission circuit 221 transmits the extended packet for C-PHY or D-PHY to the serializer 212 via the C/D-PHY physical layer processing unit 222.

In step S103, in the serializer 212, the CSI-2 reception circuit 231 receives the extended packet for C-PHY or D-PHY transmitted from the image sensor 211 in step S102 via the C/D-PHY physical layer processing unit 232. Then, the CSI-2 reception circuit 231 acquires the AS payload excluding the packet header and the packet footer from the received extended packet, and supplies the AS payload as it is to the A-PHY packet for CSI-2 generation unit 235.

In step S104, in the serializer 212, the A-PHY packet for CSI-2 generation unit 235 generates the extended packet for A-PHY by adding the packet header for A-PHY and the packet footer for A-PHY to the AS payload supplied from the CSI-2 reception circuit 231. Then, the A-PHY packet for CSI-2 generation unit 235 transmits the extended packet for A-PHY to the deserializer 213 via the physical layer processing unit 237 compatible with A-PHY.

In step S105, in the deserializer 213, the A-PHY packet for CSI-2 reception unit 245 receives the extended packet for A-PHY transmitted from the serializer 212 in step S104 via the physical layer processing unit 247 compatible with A-PHY. Then, the A-PHY packet for CSI-2 reception unit 245 acquires the AS payload excluding the packet header and the packet footer from the received extended packet, and supplies the AS payload as it is to the CSI-2 transmission circuit 241.

In step S106, the CSI-2 transmission circuit 241 generates the extended packet for C-PHY or D-PHY by adding the packet header for C-PHY or D-PHY and the packet footer for C-PHY or D-PHY to the AS payload supplied from the A-PHY packet for CSI-2 reception unit 245 in step S105. Then, the CSI-2 transmission circuit 241 transmits the extended packet for C-PHY or D-PHY to the application processor 214 via the C/D-PHY physical layer processing unit 242.

In step S107, in the application processor 214, the extension mode-compatible CSI-2 reception circuit 251 receives the extended packet for C-PHY or D-PHY transmitted from the deserializer 213 in step S106 via the C/D-PHY physical layer processing unit 252. Then, the extension mode-compatible CSI-2 reception circuit 251 acquires the AS payload excluding the packet header and the packet footer from the received extended packet, and outputs various data stored in the packet data of the AS payload to a subsequent LSI (not illustrated). Thereafter, the packet transmission/reception processing adapted to E2E protection is terminated, and similar processing is repeatedly performed for the next extended packet.

As described above, the communication system 201 can transmit and receive the extended packet without modifying the AS payload on the transmission path by executing the packet transmission/reception processing adapted to E2E protection. At this time, for example, even in the case where the physical layer of the image sensor 211 is D-PHY and the physical layer of the application processor 214 is C-PHY, that is, even in the case where the respective interfaces are different, E2E protection can be observed.

Figure 25:
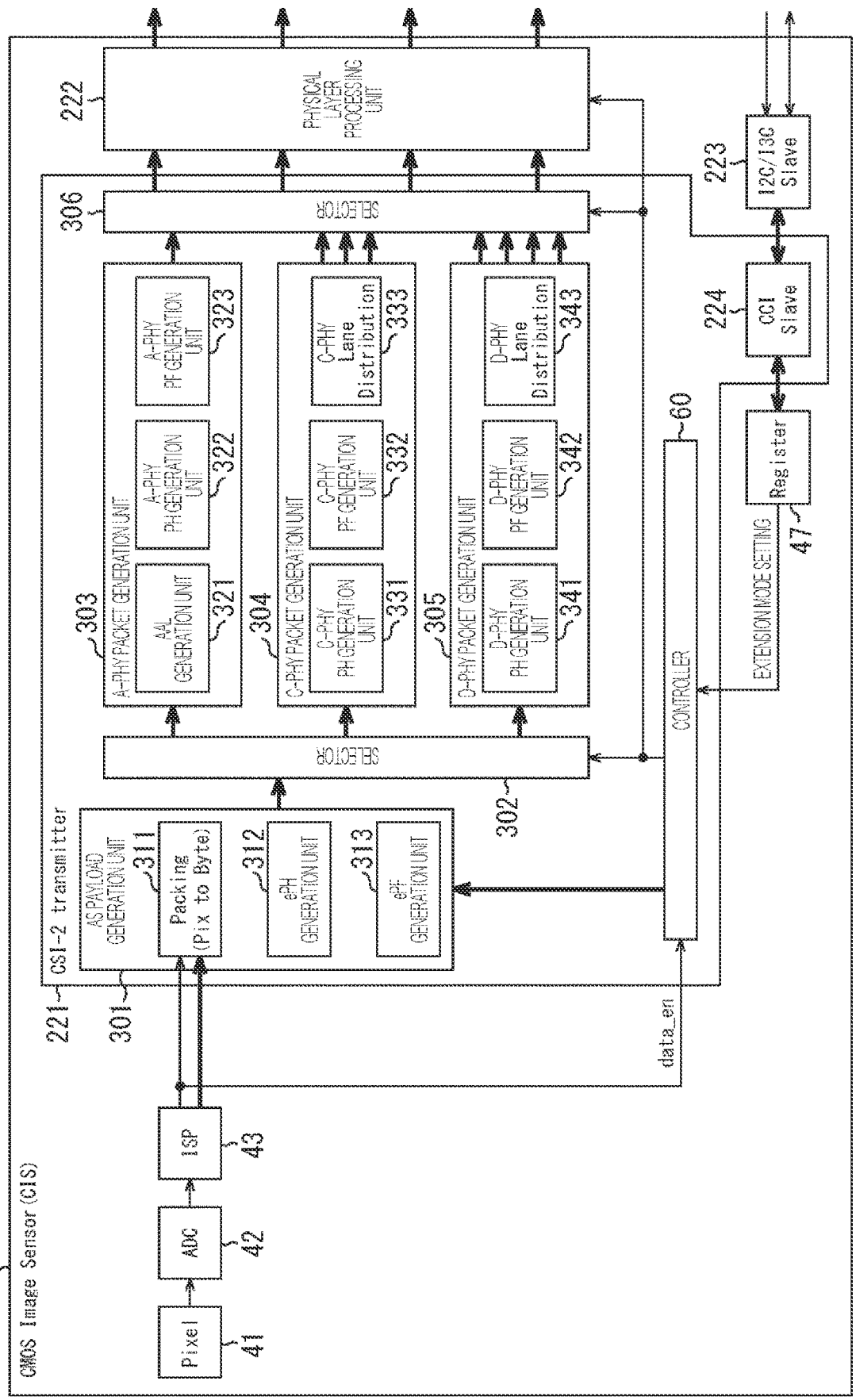
FIG. 25 is a block diagram illustrating a configuration example of an image sensor adapted to the rule of packet modification prohibition.

FIG. 25 is a block diagram illustrating a detailed configuration example of the image sensor 211. Note that, in the image sensor 211 illustrated in FIG. 25, configurations common to those of the image sensor 21 in FIG. 9 are denoted by the same reference numerals, and detailed description thereof is omitted.

That is, the image sensor 211 includes a pixel 41, an AD converter 42, an image processing unit 43, a register 47, and a controller 60, similarly to the image sensor 21 in FIG. 9. Furthermore, the I2C/I3C slave 223 and the CCI slave 224 included in the image sensor 211 correspond to the I2C/I3C slave 46 and the CCI slave 59 in FIG. 9, respectively.

Then, the image sensor 211 includes the extension mode-compatible CSI-2 transmission circuit 221 and the physical layer processing unit 222, and the physical layer processing unit 222 is compatible with A-PHY, C-PHY, and D-PHY.

The extension mode-compatible CSI-2 transmission circuit 221 includes an AS payload generation unit 301, a selector 302, an A-PHY packet generation unit 303, a C-PHY packet generation unit 304, a D-PHY packet generation unit 305, and a selector 306 in addition to the controller 60 and the CCI slave 224.

The AS payload generation unit 301 generates the AS payload limited as the protection range of E2E protection, and outputs the AS payload to the selector 302. For example, the AS payload generation unit 301 includes a packing unit 311, an extended packet header generation unit 312, and an extended packet footer generation unit 313.

The packing unit 311 packs the image data supplied from the image processing unit 43 as data to be transmitted, and generates packet data of the number of bytes determined by the packet count PC. For example, the controller 60 can control the number of bytes of the packet data generated by the packing unit 311 according to a setting value (for example, an image size or the like) stored in the register 47.

For example, as described with reference to FIGS. 21 to 23, the extended packet header generation unit 312 generates the extended packet header in which the packet count PC and the virtual channel VC are described, and adds the extended packet header to the packet data. The extended packet footer generation unit 313 generates and adds the extended packet footer to the packet data.

The selector 302 selects one of the A-PHY packet generation unit 303, the C-PHY packet generation unit 304, and the D-PHY packet generation unit 305 provided in parallel, as an output destination of the AS payload supplied from the AS payload generation unit 301 under the control of the controller 60.

The A-PHY packet generation unit 303 generates the extended packet for A-PHY from the AS payload supplied via the selector 302, and outputs the extended packet to the selector 306. For example, the A-PHY packet generation unit 303 includes an AAL generation unit 321, an A-PHY packet header generation unit 322, and an A-PHY packet footer generation unit 323.

For example, the A-PHY adaptive layer (AAL) generation unit 321 divides the AS payload generated by the AS payload generation unit 301 for every 380 bytes in a hierarchy called adaptive layer. Then, the A-PHY packet header generation unit 322 adds the packet header for A-PHY and the A-PHY packet footer generation unit 323 adds the packet footer for A-PHY to the divided AS payload.

The C-PHY packet generation unit 304 generates the extended packet for C-PHY from the AS payload supplied via the selector 302, and outputs the extended packet to the selector 306. For example, the C-PHY packet generation unit 304 includes a C-PHY packet header generation unit 331, a C-PHY packet footer generation unit 332, and a C-PHY lane distribution unit 333.

For example, the C-PHY packet header generation unit 331 adds the packet header for C-PHY and the C-PHY packet footer generation unit 332 adds the packet footer for C-PHY to the AS payload generated in the AS payload generation unit 301. Then, the C-PHY lane distribution unit 333 distributes the extended packet for C-PHY to three lanes conforming to the CSI-2 standard.

The D-PHY packet generation unit 305 generates the extended packet for D-PHY from the AS payload supplied via the selector 302, and outputs the extended packet to the selector 306. For example, the D-PHY packet generation unit 305 includes a D-PHY packet header generation unit 341, a D-PHY packet footer generation unit 342, and a D-PHY lane distribution unit 343.

For example, the D-PHY packet header generation unit 341 adds the packet header for D-PHY and the D-PHY packet footer generation unit 342 adds the packet footer for D-PHY to the AS payload generated in the AS payload generation unit 301. Then, the D-PHY lane distribution unit 343 distributes the extended packet for D-PHY to four lanes conforming to the CSI-2 standard.

The selector 306 selects one of the A-PHY packet generation unit 303, the C-PHY packet generation unit 304, and the D-PHY packet generation unit 305 provided in parallel, as an output source of the extended packet to be supplied to the physical layer processing unit 222 under the control of the controller 60.

Then, in a case where the extended packet for A-PHY is supplied from the A-PHY packet generation unit 303, the physical layer processing unit 222 transmits the extended packet for A-PHY in one lane. Furthermore, in a case where the extended packet for C-PHY is supplied from the C-PHY packet generation unit 304, the physical layer processing unit 222 transmits the extended packet for C-PHY in three lanes. Furthermore, in a case where the extended packet for D-PHY is supplied from the D-PHY packet generation unit 305, the physical layer processing unit 222 transmits the extended packet for D-PHY in four lanes.

In the image sensor 211 configured as described above, the extension mode-compatible CSI-2 transmission circuit 221 is configured such that the AS payload generation unit 301 is connected to the A-PHY packet generation unit 303, the C-PHY packet generation unit 304, and the D-PHY packet generation unit 305 via the selector 302. Thereby, the image sensor 211 can generate the AS payload common to the extended packet for A-PHY, the extended packet for C-PHY, and the extended packet for D-PHY by one AS payload generation unit 301. That is, the AS payload generation unit 301 can be shared by the A-PHY packet generation unit 303, the C-PHY packet generation unit 304, and the D-PHY packet generation unit 305, whereby the circuit scale can be reduced. Therefore, downsizing of the image sensor 211 can be implemented.

Figure 26:
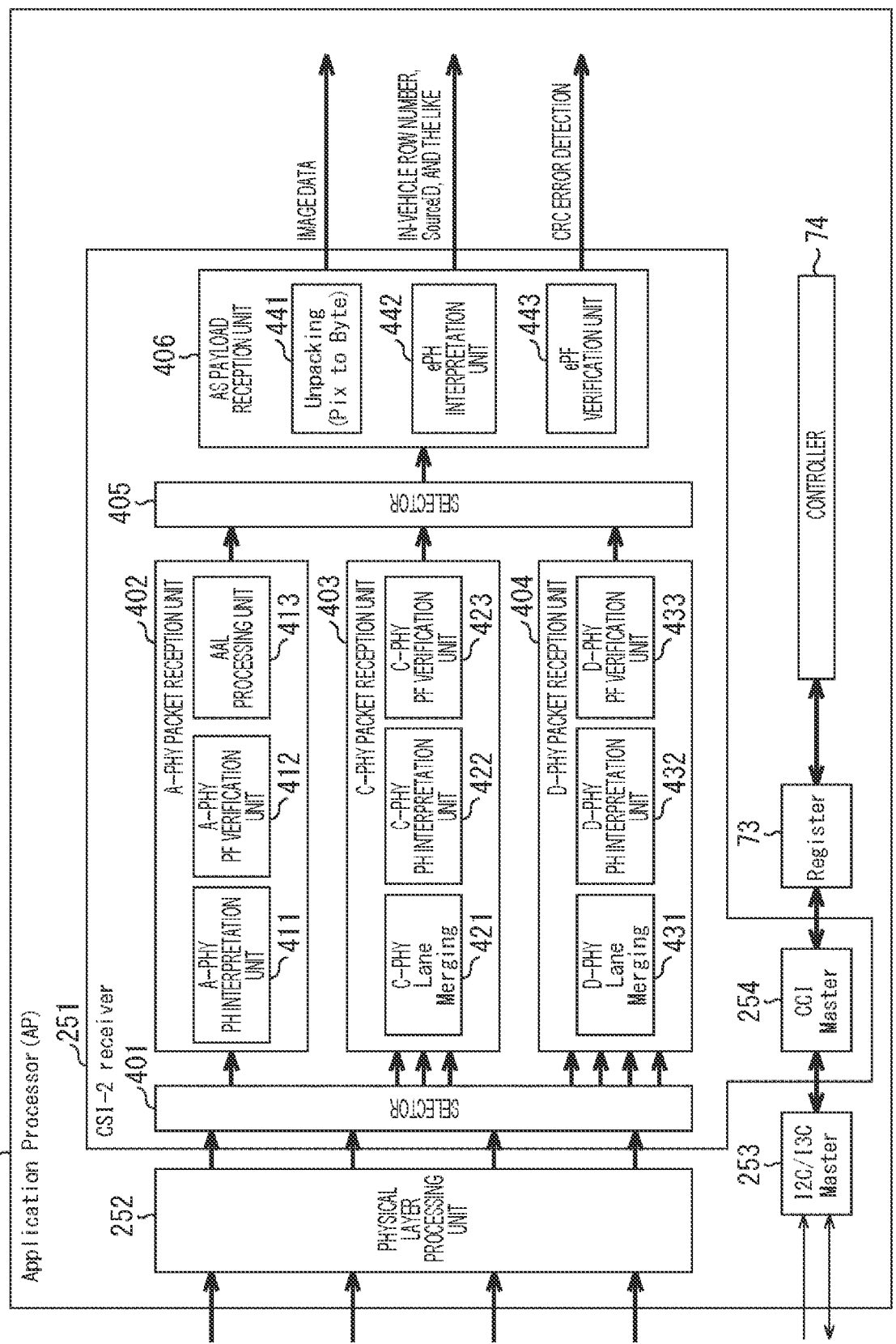
FIG. 26 is a block diagram illustrating a configuration example of an application processor adapted to the rule of packet modification prohibition.

FIG. 26 is a block diagram illustrating a detailed configuration example of the application processor 214. Note that, in the application processor 214 illustrated in FIG. 26, configurations common to those of the application processor 22 in FIG. 10 are denoted by the same reference numerals, and detailed description thereof is omitted.

That is, the application processor 214 includes a register 73 and a controller 74, similarly to the application processor 22 in FIG. 10. Note that the controller 74 may be implemented by software. Furthermore, the I2C/I3C master 253 and the CCI master 254 included in the application processor 214 correspond to the I2C/I3C master 72 and the CCI master 88 in FIG. 10, respectively.

Then, the application processor 214 includes the extension mode-compatible CSI-2 reception circuit 251 and the physical layer processing unit 252, and the physical layer processing unit 252 is compatible with A-PHY, C-PHY, and D-PHY.

The extension mode-compatible CSI-2 reception circuit 251 includes a selector 401, an A-PHY packet reception unit 402, a C-PHY packet reception unit 403, a D-PHY packet reception unit 404, a selector 405, and an AS payload reception unit 406 in addition to the CCI master 254.

The selector 401 selects one of the A-PHY packet reception unit 402, the C-PHY packet reception unit 403, and the D-PHY packet reception unit 404 provided in parallel, as an output destination of the extended packet supplied from the physical layer processing unit 252.

The A-PHY packet reception unit 402 receives the extended packet for A-PHY supplied via the selector 401 and outputs the extended packet to the selector 405. For example, the A-PHY packet reception unit 402 includes an A-PHY packet header interpretation unit 411, an A-PHY packet footer verification unit 412, and an AAL processing unit 413.

For example, the A-PHY packet header interpretation unit 411 interprets content described in the packet header for A-PHY and performs processing necessary for receiving the extended packet for A-PHY, and the A-PHY packet footer verification unit 412 verifies the presence or absence of an error using the packet footer for A-PHY. Then, the AAL processing unit 413 performs processing of combining the adaptive layers divided by the AAL generation unit 321 in FIG. 25.

The C-PHY packet reception unit 403 receives the extended packet for C-PHY supplied via the selector 401 and outputs the extended packet to the selector 405. For example, the C-PHY packet reception unit 403 includes a C-PHY lane merging unit 421, a C-PHY packet header interpretation unit 422, and a C-PHY packet footer verification unit 423.

For example, the C-PHY lane merging unit 421 merges the extended packets for C-PHY distributed to three lanes conforming to the CSI-2 standard and supplied via the physical layer processing unit 252. Then, the C-PHY packet header interpretation unit 422 interprets content described in the packet header for C-PHY and performs processing necessary for receiving the extended packet for C-PHY, and the C-PHY packet footer verification unit 423 verifies the presence or absence of an error using the packet footer for C-PHY.

The D-PHY packet reception unit 404 receives the extended packet for D-PHY supplied via the selector 401 and outputs the extended packet to the selector 405. For example, the D-PHY packet reception unit 404 includes a D-PHY lane merging unit 431, a D-PHY packet header interpretation unit 432, and a D-PHY packet footer verification unit 433.

For example, the D-PHY lane merging unit 431 merges the extended packets for D-PHY distributed to four lanes conforming to the CSI-2 standard and supplied via the physical layer processing unit 252. Then, the D-PHY packet header interpretation unit 432 interprets content described in the packet header for D-PHY and performs processing necessary for receiving the extended packet for D-PHY, and the D-PHY packet footer verification unit 433 verifies the presence or absence of an error using the packet footer for D-PHY.

The selector 405 selects one of the A-PHY packet reception unit 402, the C-PHY packet reception unit 403, and the D-PHY packet reception unit 404 provided in parallel, as an output source of the extended packet to be supplied to the AS payload reception unit 406.

The AS payload reception unit 406 includes an unpacking unit 441, an extended packet header interpretation unit 442, and an extended packet footer verification unit 443 corresponding to the AS payload generation unit 301 in FIG. 25. The unpacking unit 441 unpacks the image data packed by the packing unit 311. The extended packet header interpretation unit 442 interprets the extended packet header generated by the extended packet header generation unit 312, and reads, for example, the packet count PC and the virtual channel VC. The extended packet footer verification unit 443 verifies the presence or absence of an error using the extended packet footer added by the extended packet footer generation unit 313. Then, the AS payload reception unit 406 outputs various types of data stored in the packet data supplied via the selector 405, for example, image data, an in-vehicle row number, a CRC error, SourceID, and the like to a subsequent LSI (not illustrated).

In the application processor 214 configured as described above, the extension mode-compatible CSI-2 reception circuit 251 is configured such that the AS payload reception unit 406 is connected to the A-PHY packet reception unit 402, the C-PHY packet reception unit 403, and the D-PHY packet reception unit 404 via the selector 405. Thereby, the application processor 214 can receive the AS payload common to the extended packet for A-PHY, the extended packet for C-PHY, and the extended packet for D-PHY by one AS payload reception unit 406. That is, the AS payload reception unit 406 can be shared by the A-PHY packet reception unit 402, the C-PHY packet reception unit 403, and the D-PHY packet reception unit 404, whereby the circuit scale can be reduced. Therefore, downsizing of the application processor 214 can be implemented.

Configuration Example of Computer

Next, the above-described series of processing (communication method) can be executed by hardware or software. In a case of executing the series of processing by software, a program that configures the software is installed in a general-purpose computer or the like.

Figure 27:
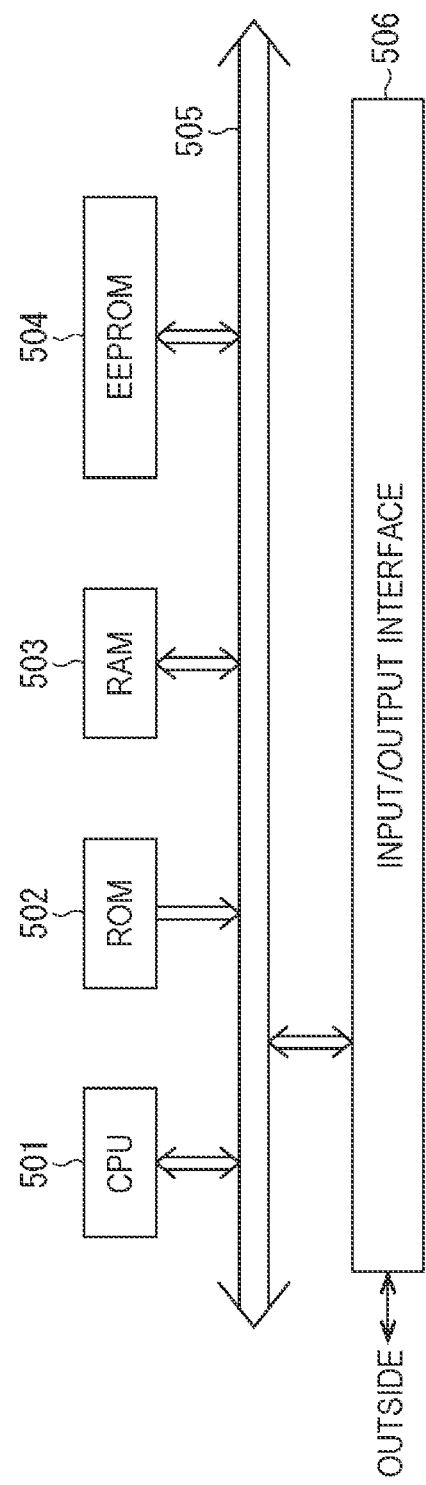
FIG. 27 is a block diagram illustrating a configuration example of an embodiment of a computer to which the present technology is applied.

FIG. 27 is a block diagram illustrating a configuration example of hardware of a computer that executes the above-described series of processing by a program.

In the computer, a central processing unit (CPU) 501, a read only memory (ROM) 502, a random access memory (RAM) 503, and an electrically erasable programmable read only memory (EEPROM) 504 are mutually connected by a bus 505. An input/output interface 506 is further connected to the bus 505, and the input/output interface 506 is connected to the outside.

In the computer configured as described above, the CPU 501 loads, for example, a program stored in the ROM 502 and the EEPROM 504 into the RAM 503 via the bus 505 and executes the program, so that the above-described series of processing is performed. Furthermore, the program executed by the computer (CPU 501) can be written in advance in the ROM 502, installed in the EEPROM 504 from the outside via the input/output interface 506, or updated.

Here, in the present specification, the processing performed by the computer in accordance with the program does not necessarily have to be performed in chronological order in accordance with the order described as the flowchart. In other words, the processing performed by the computer according to the program also includes processing executed in parallel or individually (for example, parallel processing or processing by an object).

Furthermore, the program may be processed by one computer (processor) or may be processed in a distributed manner by a plurality of computers. Moreover, the program may be transferred to a remote computer and executed.

Moreover, in the present specification, the term "system" means a group of a plurality of configuration elements (devices, modules (parts), and the like), and whether or not all the configuration elements are in the same housing is irrelevant. Therefore, a plurality of devices housed in separate housings and connected via a network, and one device that houses a plurality of modules in one housing are both systems.

Furthermore, for example, the configuration described as one device (or processing unit) may be divided into and configured as a plurality of devices (or processing units). On the contrary, the configuration described as a plurality of devices (or processing units) may be collectively configured as one device (or processing unit). Furthermore, a configuration other than the above-described configuration may be added to the configuration of each device (or each processing unit). Moreover, a part of the configuration of a certain device (or processing unit) may be included in the configuration of another device (or another processing unit) as long as the configuration and operation of the system as a whole are substantially the same.

Furthermore, for example, in the present technology, a configuration of cloud computing in which one function is shared and processed in cooperation by a plurality of devices via a network can be adopted.

Furthermore, for example, the above-described program can be executed by an arbitrary device. In that case, the device is only required to have necessary functions (functional blocks and the like) and obtain necessary information.

Furthermore, for example, the steps described in the above-described flowcharts can be executed by one device or can be executed by a plurality of devices in a shared manner. Moreover, in the case where a plurality of processes is included in one step, the plurality of processes included in the one step can be executed by one device or can be shared and executed by a plurality of devices. In other words, the plurality of processes included in one step can be executed as processes of a plurality of steps. Conversely, the processing described as a plurality of steps can be collectively executed as one step.

Note that, in the program executed by the computer, the processing of the steps describing the program may be executed in chronological order according to the order described in the present specification, or may be individually executed in parallel or at necessary timing when a call is made, for example. That is, the processing of each step may be executed in an order different from the above-described order as long as no contradiction occurs. Moreover, the processing of the steps describing the program may be executed in parallel with the processing of another program, or may be executed in combination with the processing of another program.

Note that the plurality of present technologies described in the present specification can be implemented independently of one another as a single unit as long as there is no inconsistency. Of course, an arbitrary number of the present technologies can be implemented together. For example, part or whole of the present technology described in any of the embodiments can be implemented in combination with part or whole of the present technology described in another embodiment. Furthermore, part or whole of the above-described arbitrary present technology can be implemented in combination with another technology not described above.

Combination Example of Configuration

Note that the present technology can also have the following configurations.

(1)

A transmission device including:
an Application Specific payload generation unit configured to add a packet header for extension different from a packet header for a physical layer to packet data obtained by packing data to be transmitted, to generate an Application Specific payload limited as a protection range to be protected by prohibiting modification on a transmission path; and
a packet generation unit configured to add at least a packet header for a predetermined physical layer to the Application Specific payload, to generate a packet for the physical layer.

(2)

The transmission device according to (1) above, in which predetermined information necessary for transmitting the Application Specific payload as the protection range is described in the packet header for extension.

(3)

The transmission device according to (2) above, in which the predetermined information is a packet count indicating a data length of the packet data.

(4)

The transmission device according to any one of (1) to (3) above, in which
a plurality of the packet generation units is provided in parallel for each of a plurality of types of the physical layers, and
the transmission device further including:
a selector configured to switch supply of the Application Specific payload from the Application Specific payload generation unit to the plurality of packet generation units.

(5)
The transmission device according to any one of (1) to (4) above, in which
the packet generation unit generates the packet for C-PHY or D-PHY and transmits the packet to a serializer via each corresponding physical layer,
the serializer obtains the Application Specific payload from the packet for C-PHY or D-PHY, generates the packet for A-PHY, and transmits the packet to a deserializer, and
the deserializer acquires the Application Specific payload from the packet for A-PHY, and generates the packet for C-PHY or D-PHY.

(6)
A reception device including:
a packet reception unit configured to receive a packet for a physical layer obtained by adding at least a packet header for the predetermined physical layer to an Application Specific payload that has a packet header for extension different from a packet header for a physical layer added to packet data obtained by packing data to be transmitted and is limited as a protection range to be protected by prohibiting modification on a transmission path; and
an Application Specific payload acquisition unit configured to acquire the Application Specific payload from the packet.

(7)
The reception device according to (6) above, in which
predetermined information necessary for transmitting the Application Specific payload as the protection range is described in the packet header for extension.

(8)
The reception device according to (7) above, in which
the predetermined information is a packet count indicating a data length of the packet data.

(9)
The reception device according to any one of (6) to (8) above, in which
a plurality of the packet reception units is provided in parallel for each of a plurality of types of the physical layers, and
the reception device further including:
a selector configured to switch supply of the Application Specific payload from the plurality of packet reception units to the Application Specific payload acquisition unit.

(10)
The reception device according to any one of (6) to (9) above, in which
a serializer obtains the Application Specific payload from the packet for C-PHY or D-PHY, generates the packet for A-PHY, and transmits the packet to a deserializer,
the deserializer acquires the Application Specific payload from the packet for A-PHY, and generates the packet for C-PHY or D-PHY, and
the packet reception unit for C-PHY or D-PHY receives the packet via each corresponding physical layer.

(11)
A communication system including:
a transmission device including
an Application Specific payload generation unit configured to add a packet header for extension different from a packet header for a physical layer to packet data obtained by packing data to be transmitted, to generate an Application Specific payload limited as a protection range to be protected by prohibiting modification on a transmission path, and
a packet generation unit configured to add at least a packet header for a predetermined physical layer to the Application Specific payload, to generate a packet for the physical layer; and
a reception device including
a packet reception unit configured to receive the packet for the physical layer transmitted from the packet generation unit, and
an Application Specific payload acquisition unit configured to acquire the Application Specific payload from the packet.

Note that the present embodiments are not limited to the above-described embodiments, and various modifications can be made without departing from the gist of the present disclosure. Furthermore, the effects described in the present specification are merely examples and are not limited, and other effects may be exhibited.

REFERENCE SIGNS LIST

11 Communication system
21 Image sensor
22 Application processor
23 and 24 Bus
25 Serializer
26 Deserializer
27 Bus
31 Extension mode-compatible CSI-2 transmission circuit
32 Extension mode-compatible CSI-2 reception circuit
33 CSI-2 reception circuit
34 SerDes transmission circuit
SerDes reception circuit
36 CSI-2 transmission circuit
41 Pixel
42 AD converter
43 Image processing unit
44 Pixel CRC calculation unit
45 Physical layer processing unit
46 I2C/I3C slave
47 Register
51 Packing unit
52 Packet header generation unit
53 Extended packet header generation unit
54 Extended packet footer generation unit
55 and 56 Selection unit
57 CRC calculation unit
58 Lane distribution unit
59 CCI slave
60 Controller
71 Physical layer processing unit
72 I2C/I3C master
73 Register
74 Controller
81 Packet header detection unit
82 Lane merging unit
83 Interpretation unit
84 and 85 Selection unit
86 CRC calculation unit
87 Unpacking unit
88 CCI master

The invention claimed is:

1. A transmission device comprising:
an application specific payload generation circuit configured to add a packet header for extension to packet data obtained by packing data to be transmitted, and configured to generate an application specific payload that is protected from modification on a transmission path;
a plurality of packet generation circuits arranged in parallel for each of a plurality of types of physical layers, each of the packet generation circuits being configured to add a packet header for a physical layer different from the packet header for extension for the application specific payload, and configured to generate a packet for the physical layer; and
a selector configured to switch supply of the application specific payload from the application specific payload generation circuit to a selected one of the plurality of packet generation circuits.

2. The transmission device according to claim 1, wherein predetermined information necessary for transmitting the application specific payload as the protection range is provided in the packet header for extension.

3. The transmission device according to claim 2, wherein the predetermined information is a packet count indicating a data length of the packet data.

4. The transmission device according to claim 1, wherein
the selected packet generation circuit generates the packet for an encoded physical layer or an unencoded physical layer and transmits the packet to a serializer via each corresponding physical layer,
the serializer obtains the application specific payload from the packet for the encoded physical layer or the unencoded physical layer, generates the packet for a long-reach serializer-deserializer physical layer, and transmits the packet to a deserializer, and
the deserializer acquires the application specific payload from the packet for the long-reach serializer-deserializer physical layer, and generates the packet for the encoded physical layer or the unencoded physical layer.

5. A transmission device comprising:
a memory storing instructions, and
at least one processor configured to execute the instructions to perform operations comprising:
adding a packet header for extension to packet data obtained by packing data to be transmitted, and generating an application specific payload that is protected from modification on a transmission path;
switching supply of the application specific payload to a selected one of a plurality of packet generation circuits,
wherein the plurality of packet generation circuits are respectively arranged in parallel for each of a plurality of types of physical layers, and each of the packet generation circuits is configured to add a packet header for a physical layer different from the packet header for extension for the application specific payload; and
generating, by the selected one of the plurality of packet generation circuits, a packet for the physical layer.

6. The transmission device according to claim 5, wherein predetermined information necessary for transmitting the application specific payload as the protection range is provided in the packet header for extension.

7. The transmission device according to claim 6, wherein the predetermined information is a packet count indicating a data length of the packet data.

8. The transmission device according to claim 5, wherein the operations further comprise:
generating, by the selected packet generation circuit, the packet for an encoded physical layer or an unencoded physical layer and transmitting the packet to a serializer via each corresponding physical layer;
obtaining, by the serializer, the application specific payload from the packet for the encoded physical layer or the unencoded physical layer, generating the packet for a long-reach serializer-deserializer physical layer, and transmitting the packet to a deserializer; and
acquiring, by the deserializer, the application specific payload from the packet for the long-reach serializer-deserializer physical layer, and generating the packet for the encoded physical layer or the unencoded physical layer.

9. A non-transitory computer readable medium storing instructions for controlling a transmission device, the instructions being executable by at least one processor to perform operations comprising:
adding a packet header for extension to packet data obtained by packing data to be transmitted, and generating an application specific payload that is protected from modification on a transmission path;
switching supply of the application specific payload to a selected one of a plurality of packet generation circuits,
wherein the plurality of packet generation circuits are arranged in parallel for each of a plurality of types of physical layers, and each of the packet generation circuits is configured to add a packet header for a physical layer different from the packet header for extension for the application specific payload; and
generating, by the selected one of the plurality of packet generation circuits, a packet for the physical layer.

10. The non-transitory computer readable medium according to claim 9, wherein predetermined information necessary for transmitting the application specific payload as the protection range is provided in the packet header for extension.

11. The non-transitory computer readable medium according to claim 10, wherein the predetermined information is a packet count indicating a data length of the packet data.

12. The non-transitory computer readable medium according to claim 9, wherein the operations further comprise:
generating, by the selected packet generation circuit, the packet for an encoded physical layer or an unencoded physical layer and transmitting the packet to a serializer via each corresponding physical layer;
obtaining, by the serializer, the application specific payload from the packet for the encoded physical layer or the unencoded physical layer, generating the packet for a long-reach serializer-deserializer physical layer, and transmitting the packet to a deserializer; and
acquiring, by the deserializer, the application specific payload from the packet for the long-reach serializer-deserializer physical layer, and generating the packet for the encoded physical layer or the unencoded physical layer.

* * * * *